United States Patent
Walsh et al.

(10) Patent No.: US 10,335,785 B2
(45) Date of Patent: Jul. 2, 2019

(54) METHODS FOR THE ISOLATION, ACCUMULATION, CHARACTERIZATION AND/OR IDENTIFICATION OF MICROORGANISMS USING A FILTRATION AND SAMPLE TRANSFER DEVICE

(75) Inventors: John Walsh, Durham, NC (US); Jones Hyman, Wake Forest, NC (US); Christopher Ronsick, Durham, NC (US)

(73) Assignee: bioMerieux, Inc., Durham, NC (US)

( * ) Notice: Subject to any disclaimer, the term of this patent is extended or adjusted under 35 U.S.C. 154(b) by 558 days.

(21) Appl. No.: 13/328,379

(22) Filed: Dec. 16, 2011

(65) Prior Publication Data

US 2012/0156716 A1    Jun. 21, 2012

Related U.S. Application Data

(60) Provisional application No. 61/424,418, filed on Dec. 17, 2010.

(51) Int. Cl.
*B01L 3/00*    (2006.01)

(52) U.S. Cl.
CPC ........... *B01L 3/50255* (2013.01); *B01L 3/561* (2013.01); *B01L 2300/0681* (2013.01)

(58) Field of Classification Search
CPC ............. B01L 2300/0681; B01L 3/561; B01L 3/50255
USPC ........................................ 435/34, 283.1, 534
See application file for complete search history.

(56) References Cited

U.S. PATENT DOCUMENTS

| | | | |
|---|---|---|---|
| 3,874,851 A | | 4/1975 | Hurvitz et al. |
| 4,541,268 A | | 9/1985 | Bundesrep et al. |
| 4,862,753 A | | 9/1989 | Lovette et al. |
| 4,999,164 A | | 3/1991 | Puchinger et al. |
| 5,112,488 A | * | 5/1992 | Lemonnier ............ B01D 29/05 210/541 |
| 5,747,351 A | | 5/1998 | Hemmati |
| 5,833,927 A | | 11/1998 | Raybuck et al. |
| 5,840,841 A | * | 11/1998 | Zuckermann et al. ....... 530/338 |

(Continued)

FOREIGN PATENT DOCUMENTS

| | | |
|---|---|---|
| CN | 1192274 A | 5/1998 |
| EP | 0455904 | 11/1991 |

(Continued)

OTHER PUBLICATIONS

The International Search Report and Written Opinion of the International Searching Authority for PCT/US2011/065449 dated Jun. 11, 2012.

*Primary Examiner* — Michael L Hobbs

(57) ABSTRACT

The present invention is directed to methods, devices and kits for separating, accumulating, characterizing and/or identifying microorganisms in a test sample. The method of the invention includes optionally lysing non-microorganism cells and/or particulates that may be present in a test sample, followed by a subsequent filtration step for isolation and/or accumulation of microorganisms. The filtration and sample transfer device may be used for isolation and/or accumulation of microorganisms by filtration. Once the microorganisms have been filtered for isolation and/or accumulation, the microorganisms can be analyzed to acquire measurements for the characterization and/or identification of said microorganisms.

23 Claims, 13 Drawing Sheets

(56) References Cited

U.S. PATENT DOCUMENTS

| | | | |
|---|---|---|---|
| 5,846,209 | A | 12/1998 | Hakalehto |
| 5,897,993 | A | 4/1999 | Sato et al. |
| 6,051,394 | A | 4/2000 | Simmons et al. |
| 6,177,266 | B1 | 1/2001 | Krishnamurthy et al. |
| 6,309,608 | B1 * | 10/2001 | Zhou et al. .................. 506/40 |
| 6,569,385 | B1 * | 5/2003 | Little et al. .................. 422/502 |
| 6,787,111 | B2 * | 9/2004 | Roach et al. .................. 422/509 |
| 7,070,739 | B1 | 7/2006 | Anderson et al. |
| 2002/0185428 | A1 | 12/2002 | Sheer et al. |
| 2003/0199001 | A1 | 4/2003 | Pitt et al. |
| 2004/0050787 | A1 | 3/2004 | Kopaciewicz et al. |
| 2004/0072375 | A1 * | 4/2004 | Gjerde et al. .................. 436/541 |
| 2004/0219628 | A1 | 11/2004 | Yoshikazu et al. |
| 2005/0019950 | A1 * | 1/2005 | Gierde et al. .................. 436/177 |
| 2006/0216206 | A1 | 9/2006 | Downs et al. |
| 2007/0175278 | A1 | 8/2007 | Pupples et al. |
| 2007/0196813 | A1 | 8/2007 | Baum et al. |
| 2010/0120085 | A1 | 5/2010 | Hyman et al. |

FOREIGN PATENT DOCUMENTS

| | | |
|---|---|---|
| WO | WO 92/17110 | 11/1992 |
| WO | WO 01/11006 | 9/2001 |
| WO | WO 2009/144560 | 12/2009 |

\* cited by examiner

Fig. 1A
Fig. 1B
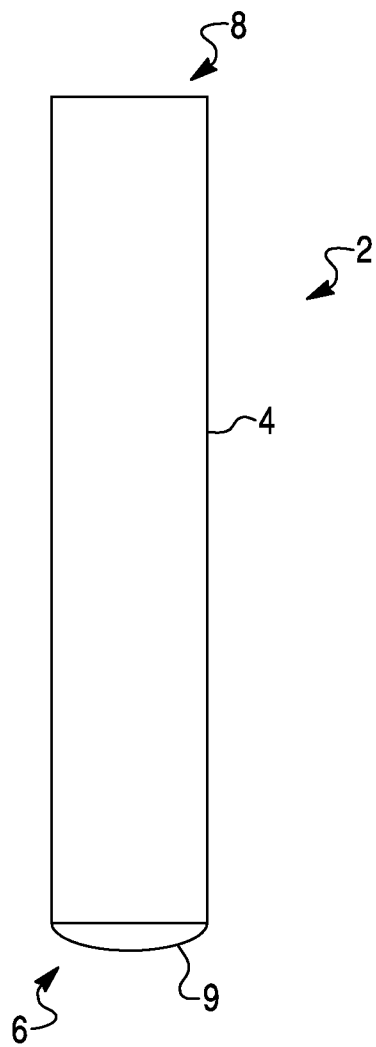
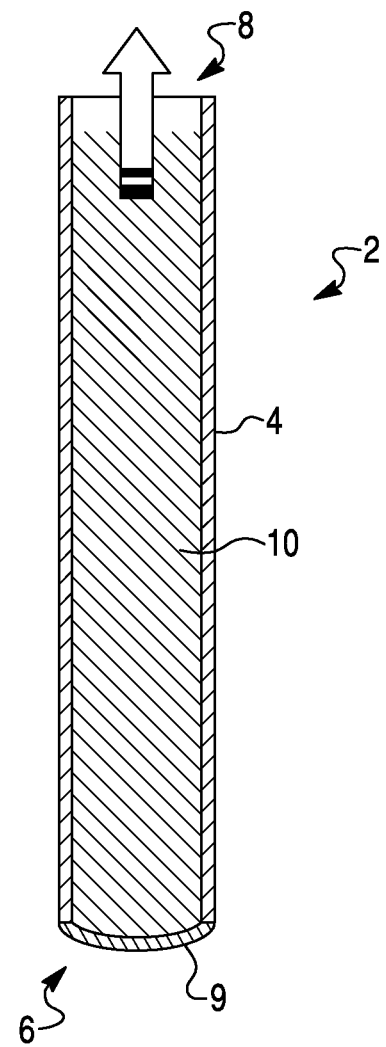

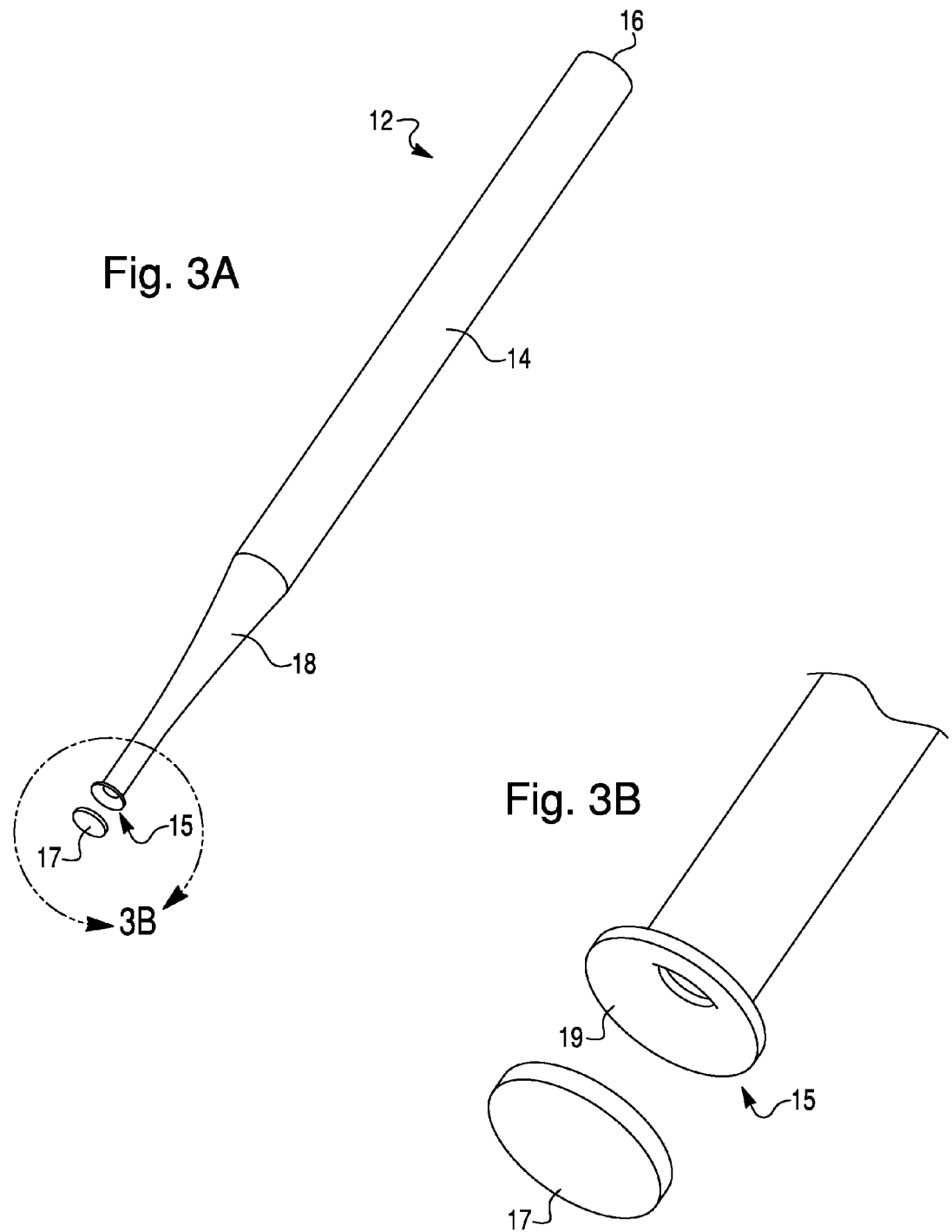

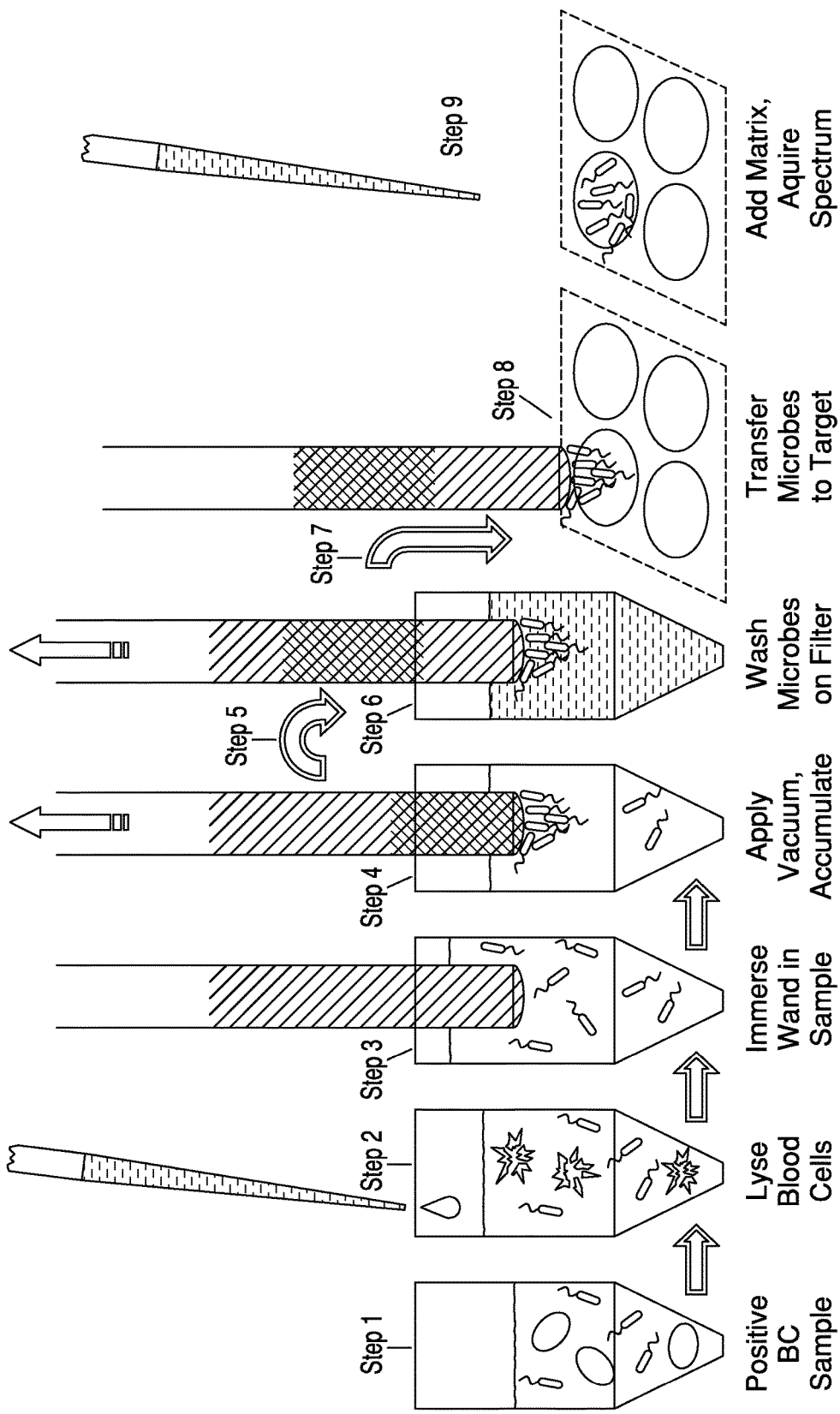

METHODS FOR THE ISOLATION, ACCUMULATION, CHARACTERIZATION AND/OR IDENTIFICATION OF MICROORGANISMS USING A FILTRATION AND SAMPLE TRANSFER DEVICE

CROSS REFERENCE TO RELATED APPLICATION

This application claims the benefit of U.S. Provisional Patent Application No. 61/424,418, entitled, "Methods for the Isolation, Accumulation, Characterization and/or Identification of Microorganisms using a Filtration and Sample Transfer Device", filed Dec. 17, 2010, which is incorporated herein.

FIELD OF THE INVENTION

The present invention relates to methods and devices for isolating, accumulating, characterizing and/or identifying microorganisms in a test sample. In one aspect, the present invention is directed to a method employing the use of a filtration and sample transfer device for the isolation, accumulation, transfer and subsequent characterization and/or identification of microorganisms in a test sample. In another aspect, the present invention is directed to methods and kits for isolating, accumulating and/or purifying microorganisms from a sample.

BACKGROUND OF THE INVENTION

The detection of pathogenic microorganisms in biological fluids should be performed in the shortest possible time, in particular in the case of septicemia for which the mortality remains high in spite of the broad range of antibiotics which are available to doctors. The presence of biologically active agents such as a microorganism in a patient's body fluid, especially blood, is generally determined using blood culture bottles. Bloodstream infections are associated with high morbidity and mortality, yet current diagnostic methods, of culture followed by biochemical identification and antibiotic susceptibility testing, can take several days to perform. Typically, empiric therapy is initiated based on clinical symptoms, and test results only impact clinical decisions when the initial therapy fails. The ability to characterize bloodstream infections within the first few hours, preferably within an hour after a positive blood culture result would significantly boost the clinical relevance of the diagnostic information provided. Molecular amplification methods have been proposed to fill this need, but serious challenges to this approach remain. The positive blood culture broth itself represents a naturally amplified population of microorganisms with potential for use in a variety of rapid, identification (ID) tests.

Traditional automated phenotypic ID tests, such as the Vitek®, Phoenix™ and Microscan® systems, or manual phenotypic tests such as API require that microorganisms be in an appropriate growth phase and free of interfering media and blood products in order to provide robust results. These systems use colonies grown from the positive broth for 18-24 hours on plated media. However, in an effort to obtain faster results, some laboratories have reported using these systems with microorganisms isolated from positive blood culture bottles. These direct-from-the-bottle tests are not appropriate for all microorganisms (e.g., Gram-positive cocci), are not validated by the test manufacturers, and generally take 3-8 hours to provide results. Faster and more broadly specific tests are urgently needed in order to provide the physician with clinically relevant results within the first few hours, preferably within an hour after a positive culture result.

Mass spectrometric methods have the potential to allow for identification of microorganisms very quickly, but may encounter interference from the many compounds present in liquid microbiological culture media and in clinical samples such as blood or combinations thereof. The most commonly employed methods for recovering microorganisms directly from positive blood culture broth are two-step differential centrifugation and centrifugation in a serum separator tube.

Other Methods for Separation, Characterization and/or Identification of Microorganisms have been Described, Include:

U.S. Pat. No. 6,177,266 discloses a method for the chemotaxonomic classification of bacteria with genus, species and strain specific biomarkers generated by matrix assisted laser desorption ionization time-of-flight mass spectrometry (MALDI-TOF-MS) analysis of either cellular protein extracts or whole cells.

In U.S. Pat. No. 7,070,739 a method is presented to extract, separate, and purify microbes including viruses by two-dimensional ultra-centrifuging directly from body fluids or homogenized tissue. In a first centrifuging step, all particles are removed having a sedimentation speed higher than those of the microbes to be identified. In the second ultra-centrifuging step, isopycnic banding is used in liquids filled in to form a wide-range density gradient, using special serrated centrifuge tubes. According to the patent, the separation technique can be used for detecting banded particles by light scatter or fluorescence using nucleic acid specific dyes, and for recovering the banded particles in very small volumes for characterization by mass spectrometry of viral protein subunits and intact viral particles, and by fluorescence flow cytometric determination of both nucleic acid mass and the masses of fragments produced by restriction enzymes.

EP0533912A describes a sample pretreatment apparatus and method for dialysis fluid and urine. The patent application describes the use of a large pore size pre-filter to remove typical urinary sediments such as blood cells, epithelial cells, casts, mucus and crystals. Any bacteria present pass through the pre-filter and are captured on a second downstream filter. Captured bacteria are then accessed by manually disassembling the stacked apparatus.

U.S. Pat. Appl. Pub. No. 2007/0175278 describes using a liquid culture medium for culturing a sample of interest, including for example, blood, urine, feces, intravenous catheters etc., industrial production lines, water systems, a food product, a cosmetic product, a pharmaceutical product and a forensic sample. Subsequently, the microorganisms can be harvested from the liquid medium by methods known in the art, e.g. by centrifugation. The concentrated microorganisms may then be transferred to carrier material, optionally after drying, for obtaining a vibrational spectrum. The patent application discusses various methods for identifying and classifying microorganisms, including vibrational spectroscopy, such as Raman spectroscopy.

However, these methods have several drawbacks when attempting to separate and characterize microorganisms from some clinical test samples (e.g., complex samples such as blood-containing culture media). In the case of blood-containing culture media, the resultant microbial preparations often contain contaminating red blood cells, platelets, lipid particles, plasma enzymes and cellular debris, which can cause poor results. These methods are also very laborintensive and unsafe due to steps which can result in aerosol exposure of potentially dangerous pathogens to the user.

Co-assigned U.S. Pat. Appl. Pub. No. 2010/0120085 describes methods for separating, characterizing and/or identifying microorganisms in a test sample. The method described a sample preparation procedure comprising of a selective lysis step and subsequent separation step for the isolation and purification of an unknown microorganism from a test sample for identification of the microorganism using mass spectrometry. The application also describes using filtration for the isolation and purification of an unknown microorganism from a test sample.

Accordingly, there remains a need for improved sample preparation methods, devices and/or kits for the isolation and/or accumulation of microorganisms from clinical test samples, which are compatible with rapid identification technologies such as mass spectrometry. Furthermore, there remains a need for improved sample preparation methods, devices and/or kits for simultaneous isolation and/or accumulation of a plurality of microorganisms from a plurality of clinical test samples, which are compatible with rapid and automated techniques for identification of microorganisms. The methods and devices described herein produce a clean, concentrated, sample of microorganisms that is optimal for analysis, for example, by mass spectrometry, especially for MALDI-TOF MS analysis.

SUMMARY OF THE INVENTION

The present invention provides methods, devices and kits for the isolation, separation and/or accumulation for subsequent characterization and/or identification of microorganisms in a sample. The methods allow for the characterization and/or identification of microorganisms more quickly than prior techniques, resulting in faster diagnoses (e.g., in a subject having or suspected of having septicemia, meningitis or a urinary tract infection) and identification of contaminated materials (e.g., foodstuffs and pharmaceuticals) or water. The steps involved in the methods of the invention, from obtaining a sample to characterization and/or identification of microorganisms, can be carried out in a very short time frame to produce clinically relevant actionable information, e.g., in less than about 120 minutes.

In one aspect, the present invention is directed to a method of isolating and subsequently characterizing and/or identifying a microorganism from a test sample, comprising:
(a) obtaining a test sample known to contain or that may contain microorganisms;
(b) optionally lysing non-microorganism cells and/or particulates in said test sample producing a lysed sample;
(c) isolating and accumulating said microorganisms from other components of said test sample or said lysed sample by filtration using an integrated filtration and sample transfer device;
(d) transferring said isolated microorganism sample to a container or slide appropriate for analyzing and/or interrogating said isolated and accumulated microorganism sample;
(e) analyzing said isolated or accumulated sample of said microorganisms to acquire measurements for the characterization and/or identification of said microorganism; and
(f) characterizing and/or identifying said microorganisms in said isolated and accumulated sample based on the acquired measurements.

In another aspect, the present invention is directed to a method of isolating, and subsequently characterizing and/or identifying a microorganism from a blood culture, comprising:
(a) obtaining a sample from a blood culture known to contain or that may contain microorganisms;
(b) optionally lysing non-microorganism cells and/or particulates in said sample to produce a lysed sample;
(c) isolating and accumulating said microorganisms from other components of said lysed sample by filtration using an integrated filtration and sample transfer device;
(d) transferring said isolated microorganism sample to a mass spectrometry plate;
(e) analyzing said isolated and accumulated sample of said microorganisms by mass spectrometry to acquire a mass spectrum of said microorganism; and
(f) characterizing and/or identifying said microorganisms in said isolated and accumulated sample by comparison of the acquired mass spectrum with reference mass spectra.

In yet another aspect, the present invention is directed to a method of isolating, and subsequently characterizing and/or identifying a microorganism from a urine specimen, comprising:
(a) obtaining a sample of urine known to contain or that may contain microorganisms;
(b) optionally lysing non-microorganism cells and/or particulates in said urine sample to produce a lysed sample;
(c) isolating and accumulating said microorganisms from other components of said optionally lysed sample by filtration using an integrated filtration and sample transfer device;
(d) transferring said isolated microorganism sample to a container or slide appropriate for analyzing and/or interrogating said isolated and accumulated microorganism sample;
(e) analyzing said isolated or accumulated sample of said microorganisms to acquire measurements for the characterization and/or identification of said microorganism; and
(f) characterizing and/or identifying said microorganisms in said isolated and accumulated sample based on the acquired measurements.

In one embodiment, the isolated or accumulated sample of said microorganisms can be analyzed using spectroscopic interrogation, e.g., based on intrinsic characteristics of the microorganisms (e.g., intrinsic fluorescence) or the vibrational structure of constituent molecules (e.g., Raman spectroscopy). In another embodiment, the isolated or accumulated microorganisms can be analyzed by mass spectrometry (e.g., MALDI-TOF-MS).

In accordance with another embodiment of the invention, the integrated filtration and sample transfer device may comprise a hollow elongated body (e.g., a cylindrical, hexagonal, or similarly shaped elongated hollow tube) having a first end or tip that is provided with, or capped with a filtration material (e.g., a filtration membrane), wherein said filtration material is located adjacent to and external from said first end or tip, and a second end operable for providing fluid flow for filtration. For example, the second end can be adapted for connection to a vacuum system, a syringe, a plunger or similar device to generate a vacuum. In another embodiment, the hollow cylindrical body comprises a long and narrow body made of glass, plastic, metal, or other like material. In still another embodiment, as an alternate to a vacuum source, the filtration and sample transfer device may use an internally packed adsorbent to provide sufficient capillary action and/or wicking force for filtration and washing. For example, the adsorbent can provide for passive filtration by providing a capillary action or wicking force for fluid flow.

In another embodiment, the present invention is also directed to an integrated filtration and sample transfer assembly comprising a plurality of integrated filtration and sample transfer devices for the isolation and/or accumulation of a plurality of test samples and for the simultaneous transfer of the plurality of isolated and/or accumulated microorganisms to a container, slide or plate for analyzing said isolated or accumulated microorganisms.

In yet another embodiment, the present invention is also directed to a two-part sample filtration and transfer system comprising a filtration assembly operable for the isolation and/or accumulation of microorganisms for a plurality of test samples by filtration and a transfer assembly operable for the simultaneous transfer of said plurality of isolated and/or accumulated microorganisms to a slide or plate for analysis.

In still another aspect, the present invention is directed to a kit for the isolation, accumulation and/or purification of microorganisms from a test sample comprising, in a packaged combination:
(a) optionally a selective lysis buffer for the selective lysis of non-microorganisms known to be present or that may be present in a test sample;
(b) an integrated filtration and sample transfer device wherein said device is operable for the isolation, accumulation and/or purification of microorganisms from a test sample, and for the subsequent transfer of microorganisms to a container, slide or plate for analysis; and
(c) at least one wash fluid or buffer for washing the isolated, accumulated and/or purified microorganism sample. In one embodiment, the integrated filtration and sample transfer device comprises a hollow elongated shaped body having a first end or tip that is provided with, or capped with a filtration material, wherein said filtration material is located adjacent to and external from said first end or tip, and a second end operable for providing fluid flow for filtration.

The present invention is explained in greater detail in the figures herein and the description set forth below.

BRIEF DESCRIPTION OF THE FIGURES

FIG. 1A shows a front view of an integrated filtration and sample transfer device, in accordance with the present invention. FIG. 1B shows a cross-sectional view of the integrated filtration and sample transfer device shown in FIG. 1A.

FIG. 3A shows an exploded view of the integrated filtration and sample transfer device illustrated in FIG. 2 and FIG. 3B shows a detailed view of a first end of the device.

FIG. 9A shows a perspective view of a slide or plate being placed onto the bottom gasket plate. FIG. 9B shows a perspective view of the bottom gasket and slide or plate. FIG. 9C shows an exploded view of the bottom gasket in alignment with the transfer pin block. FIG. 9D shows a perspective view of the bottom gasket plate position on top of, and in alignment with, the transfer pin block.

FIG. 13 shows a schematic representation of a method comprising a lysis step, separation step and transfer step, facilitated with the integrated filtration and sample transfer device of FIG. 1.

DETAILED DESCRIPTION OF THE INVENTION

Figure 2A:
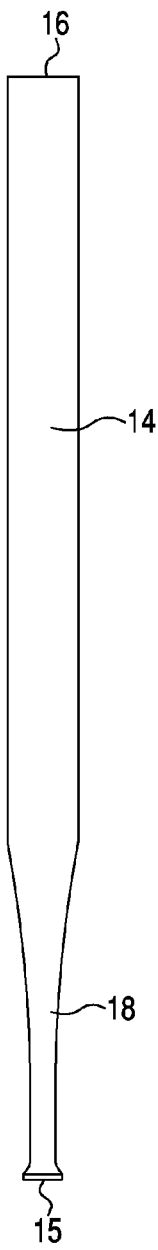
FIG. 2A shows a front view of second design concept of an integrated filtration and sample transfer device, in accordance with the present invention.

The present invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment can be deleted from that embodiment. In addition, numerous variations and additions to the embodiments suggested herein will be apparent to those skilled in the art in light of the instant disclosure, which do not depart from the instant invention.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.
Definitions.

As used herein, "a," "an," or "the" can mean one or more than one. For example, "a" cell can mean a single cell or a multiplicity of cells.

Also as used herein, "and/or" refers to and encompasses any and all possible combinations of one or more of the associated listed items, as well as the lack of combinations when interpreted in the alternative ("or").

Furthermore, the term "about," as used herein when referring to a measurable value such as an amount of a compound or agent of this invention, dose, time, temperature, and the like, is meant to encompass variations of ±20%, ±10%, ±5%, ±1%, ±0.5%, or even ±0.1% of the specified amount.

As used herein, the term "microorganism" is intended to encompass organisms that are generally unicellular, which can be multiplied and handled in the laboratory, including but not limited to, Gram-positive or Gram-negative bacteria, yeasts, molds, parasites, and mollicutes. Non-limiting examples of Gram-negative bacteria of this invention include bacteria of the following genera: *Pseudomonas, Escherichia, Salmonella, Shigella, Enterobacter, Klebsiella, Serratia, Proteus, Campylobacter, Haemophilus, Morganella, Vibrio, Yersinia, Acinetobacter, Stenotrophomonas, Brevundimonas, Ralstonia, Achromobacter, Fusobacterium, Prevotella, Branhamella, Neisseria, Burkholderia, Citrobacter, Hafnia, Edwardsiella, Aeromonas, Moraxella, Brucella, Pasteurella, Providencia*, and *Legionella*. Non-limiting examples of Gram-positive bacteria of this invention include bacteria of the following genera: *Enterococcus, Streptococcus, Staphylococcus, Bacillus, Paenibacillus, Lactobacillus, Listeria, Peptostreptococcus, Propionibacterium, Clostridium, Bacteroides, Gardnerella, Kocuria, Lactococcus, Leuconostoc, Micrococcus, Mycobacteria* and *Corynebacteria*. Non-limiting examples of yeasts and molds of this invention include those of the following genera: *Candida, Cryptococcus, Nocardia, Penicillium, Alternaria, Rhodotorula, Aspergillus, Fusarium, Saccharomyces* and *Trichosporon*. Non-limiting examples of parasites of this invention include those of the following genera: *Trypanosoma, Babesia, Leishmania, Plasmodium, Wucheria, Brugia, Onchocerca*, and *Naegleria*. Non-limiting examples of mollicutes of this invention include those of the following genera: *Mycoplasma* and *Ureaplasma*.

In one embodiment, as described in further detail herein, microorganisms from a sample or growth medium can be "separated" or "isolated" and subsequently interrogated to characterize and/or identify the microorganism present in the sample. As used herein, the term "separate" is intended to encompass any sample of microorganisms that has been removed, concentrated or otherwise set apart from its original state, or from a growth or culture medium. For example, in accordance with this invention, microorganisms may be separated away (e.g., as a separated sample or mass of microorganism) from non-microorganism or non-microorganism components that may otherwise interfere with characterization and/or identification. The term may include a layer of microorganisms collected on a solid surface (e.g., a filter membrane). As such, a separated microorganism sample (or mass or thin film of microorganism) may include any collection or layer of microorganisms and/or components thereof that is more concentrated than, or otherwise set apart from, the original sample, and can range from a closely packed dense clump of microorganisms to a diffuse layer of microorganisms. Microorganism components that can be comprised in a separated form or sample include, without limitation, pilli, flagella, fimbriae, and capsules in any combination. Non-microorganism components that are separated away from the microorganisms may include non-microorganism cells (e.g., blood cells and/or other tissue cells), urine casts or crystals and/or any components thereof. As used herein, the term "isolated" is intended to encompass any sample of microorganisms that has been at least partially purified from its original state, or away from a growth or culture medium, and any non-microorganisms or non-microorganism components contained therein. For example, in accordance with this invention, microorganisms may be isolated away (e.g., as an isolated sample) from non-microorganisms or non-microorganism components that may otherwise interfere with characterization and/or identification. Non-microorganism components that are separated away from the microorganisms may include non-microorganism cells (e.g., blood cells and/or other tissue cells) and/or any components thereof.

In one embodiment, as described in further detail herein, microorganisms from a sample or growth medium can be "accumulated" or "captured" in, or on a filter material (e.g., a filter membrane), and subsequently interrogated to characterize and/or identify the microorganism present in the sample. As used herein, the term "accumulated" or "captured" is intended to encompass any sample of microorganisms that has been compressed or deposited into a mass or film of microorganisms. For example, microorganisms from a sample can be compressed or deposited into a mass or film on a filtration material (e.g., a filter membrane) by filtration. The term includes a collection of microorganisms (and/or components thereof) on the surface of a filter material (e.g., a filter membrane) following filtration (e.g., vacuum filtration). Microorganism components that can be comprised in compressed or deposited mass of microorganisms include, without limitation, pilli, flagella, fimbriae, and capsules in any combination. In accordance with this invention, microorganisms may be compressed or deposited into a mass (e.g., as a substantially purified microorganism mass), away from non-microorganism or non-microorganism components that may otherwise interfere with characterization and/or identification of the microorganism (e.g., by mass spectrometry). Non-microorganism components that are isolated or separated away from the microorganisms may include non-microorganism cells (e.g., blood cells and/or other tissue cells) and/or any components thereof.

As used herein, the term "analyzing said isolated or accumulated sample" is intended to encompass all well-known methods or means for analyzing, interrogating, obtaining or otherwise acquiring measurements or data that can be used for the characterization and/or identification of microorganisms (e.g. unknown microorganisms). For example, an isolated or accumulated mass of microorganisms can be analyzed or interrogated by spectroscopic methods, e.g., based on intrinsic characteristics of the microorganisms (e.g., intrinsic fluorescence) or the vibrational structure of constituent molecules (e.g., Raman spectroscopy). In another embodiment, an isolated or accumulated mass of microorganisms can be analyzed or interrogated by mass spectrometry methods (e.g., MALDI-TOF-MS) for the acquisition or measurements or data that can be used for the characterization and/or identification of unknown microorganisms, as discussed in further detail herein.

The present invention provides methods for isolating or separating microorganisms, and subsequently characterizing and/or identifying microorganisms in a sample. Moreover, the method may be particularly useful for the isolation or separation, and subsequent characterization and/or identification of microorganisms from complex samples such as blood-containing culture media or urine samples. The rapid methods also allow for the characterization and/or identification of microorganisms more quickly than prior techniques, resulting in faster diagnoses (e.g., in a subject having or suspected of having septicemia, meningitis or a urinary tract infection) and characterization/identification of contaminated materials (e.g., foodstuffs and pharmaceuticals) or water. The steps involved in the methods of the invention, from obtaining a sample to characterization/identification of microorganisms, can be carried out in a very short time frame to obtain clinically relevant actionable information. In certain embodiments, the methods of the invention can be carried out in less than about 120 minutes, e.g., in less than about 110, 100, 90, 80, 70, 60, 50, 40, 30, 20, 15, 10, 5 minutes. The tremendous rapidity of the methods of the invention represents an improvement over prior methods. The methods can be used to characterize and/or identify any microorganism as described herein. In one embodiment, the microorganism is a bacterium. In another embodiment, the microorganism is a yeast. In still another embodiment, the microorganism is a mold. In a further embodiment, the microorganism is a parasite. In another embodiment, the microorganism is a mollicute. Additionally, the methods of the invention can be fully automated, thereby reducing the risk of handling infectious materials and/or contaminating the samples.

Samples

Samples that may be tested (i.e., a test sample) by the methods of the invention include both clinical and non-clinical samples in which microorganism presence and/or growth is or may be suspected, as well as samples of materials that are routinely or occasionally tested for the presence of microorganisms. The amount of sample utilized may vary greatly due to the versatility and/or sensitivity of the method. Sample preparation can be carried out by any number of techniques known to those skilled in the art although one of the advantages of the present invention is that complex sample types, such as, e.g., blood, bodily fluids, and/or other opaque substances, may be tested directly utilizing the system with little or no extensive pretreatment. In one embodiment, the sample is taken from a culture. In another embodiment, the sample is taken from a microbiological culture (e.g., a blood culture). In another embodiment, the sample is suspected of, or known to, contain microorganisms therein.

Clinical samples that may be tested include any type of sample typically tested in clinical or research laboratories, including, but not limited to, blood, serum, plasma, blood fractions, joint fluid, urine, semen, saliva, feces, cerebrospinal fluid, gastric contents, vaginal secretions, tissue homogenates, bone marrow aspirates, bone homogenates, sputum, aspirates, swabs and swab rinsates, other body fluids, and the like. In another embodiment, the clinical sample can be cultured, and a culture sample used.

The present invention finds use in research as well as veterinary and medical applications. Suitable subjects from which clinical samples can be obtained are generally mammalian subjects, but can be any animal. The term "mammal" as used herein includes, but is not limited to, humans, non-human primates, cattle, sheep, goats, pigs, horses, cats, dog, rabbits, rodents (e.g., rats or mice), etc. Human subjects include neonates, infants, juveniles, adults and geriatric subjects. Subjects from which samples can be obtained include, without limitation, mammals, birds, reptiles, amphibians, and fish.

Non-clinical samples that may be tested also include substances, encompassing, but not limited to, foodstuffs, beverages, pharmaceuticals, cosmetics, water (e.g., drinking water, non-potable water, and waste water), seawater ballasts, air, soil, sewage, plant material (e.g., seeds, leaves, stems, roots, flowers, fruit), blood products (e.g., platelets, serum, plasma, white blood cell fractions, etc.), donor organ or tissue samples, biowarfare samples, and the like. The method is also particularly well suited for real-time testing to monitor contamination levels, process control, quality control, and the like in industrial settings. In another embodiment, the non-clinical sample can be cultured, and a culture sample used.

In one embodiment of the invention, samples are obtained from a subject (e.g., a patient) having or suspected of having a microbial infection. In one embodiment, the subject has or is suspected of having septicemia, e.g., bacteremia or fungemia. The sample may be a blood sample directly from the subject. The sample may be from a blood culture grown from a sample of the patient's blood, e.g., a BacT/ALERT® blood culture. The blood culture sample may be from a positive blood culture, e.g., a blood culture that indicates the presence of a microorganism. In certain embodiments, the sample is taken from a positive blood culture within a short time after it turns positive, e.g., within about 6 hours, e.g., within about 5, 4, 3, or 2 hours, or within about 60 minutes, e.g., about 55, 50, 45, 40, 35, 30, 25, 20, 15, 10, 5 minutes. In one embodiment, the sample is taken from a culture in which the microorganisms are in log phase growth. In another embodiment, the sample is taken from a culture in which the microorganisms are in a stationary phase.

In some embodiment, to aid the recovery of adherent microorganisms, e.g., from adsorbent particles, well-known pretreatment steps for adsorbent-containing samples can be used. For example, a surfactant (e.g., Tween 80) can be added and the sample and vortexed. In other embodiments, the sample can also be sonicated to break up biofilms and release intact microorganisms. Examples include *S. aureus* bound to charcoal particles.

The volume of the sample should be sufficiently large to produce an isolated and/or accumulated sample of microorganisms or a mass of microorganisms which can be analyzed or interrogated to acquire measurements for the characterization and/or identification of said microorganism after the separation/isolation step of the methods of the invention is carried out. Appropriate volumes will depend on the source of the sample and the anticipated level of microorganisms in the sample. For example, a positive blood culture will contain a higher level of microorganisms per volume than a drinking water sample to be tested for contamination, so a smaller volume of blood culture medium may be needed as compared to the drinking water sample. In general, the sample size can be less than about 50 ml, e.g., less than about 40, 30, 20, 15, 10, 5, 4, 3, or 2 ml. In certain embodiments, the sample size can be about 1 ml, e.g., about 0.75, 0.5, or 0.25 ml. In certain embodiments in which the separation is carried out on a microscale, the sample size can be less than about 200 µl, e.g., less than about 150, 100, 50, 25, 20, 15, 10, or 5 µl. In some embodiments (e.g., when the sample is expected to comprise a small number of microorganisms), the sample size can be about 100 ml or more, e.g., about 250, 500, 750, or 1000 ml or more.

Optional Lysis Step

In some embodiments, after obtaining a sample, the next step in the method of the present invention is to selectively lyse or dissolve undesired cells and/or particulates that may be present in the sample, e.g., blood cells and/or tissue cells. Cells and/or particulates may be lysed or dissolved to permit separation and/or isolation of microorganisms from other components of the sample. The separation and/or isolation of microorganisms from other components prevents interference during the analysis or interrogation step. If non-microorganism cells are not expected to be present in the sample or not expected to interfere with the interrogation step, the lysis step may not need to be carried out. In one embodiment, the cells to be lysed are non-microorganism cells that are present in the sample. Typically, no microorganism cells that may be present in the sample are lysed. However, in some embodiments, the selective lysing of specific classes of microorganisms may be desirable and thus can be carried out according to the methods described herein and as are well known in the art. For example, a class of undesired microorganisms can be selectively lysed, e.g., yeast are lysed while bacteria are not or vice versa. In another embodiment, the desired microorganisms are lysed in order to separate a particular subcellular component of the microorganisms, e.g., cell membranes or organelles. In one embodiment, all of the non-microbial cells are lysed. In other embodiments, a portion of the non-microbial cells are lysed, e.g., enough cells to prevent interference with the interrogation step. The lysing of cells may be carried out by any method known in the art to be effective to selectively lyse cells with or without lysing microorganisms, including, without limitation, addition of a lysis solution, sonication, osmotic shock, chemical treatment, and/or a combination thereof.

A lysis solution is one that is capable of lysing cells, e.g., non-microorganism cells (e.g., by solubilizing or dissolving eukaryotic cell membranes) and/or microorganism cells. In one embodiment, the lysis solution can comprise one or more detergents, optionally one or more enzymes, or a combination of one or more detergents and one or more enzymes, and can further include additional agents. In one embodiment, the detergent can be a non-denaturing lytic detergent, such as Triton® X-100 Triton® X-100-R, Triton® X-114, NP-40, Genapol® C-100, Genapol® X-100, Igepal® CA 630, Arlasolve™ 200, Brij® 96/97, CHAPS, octyl β-D-glucopyranoside, saponin, and nonaethylene glycol monododecyl ether (C12E9, polidocenol). Optionally, denaturing lytic detergents can be included, such as sodium dodecyl sulfate, N-laurylsarcosine, sodium deoxycholate, bile salts, hexadecyltrimethylammonium bromide, SB3-10, SB3-12, amidosulfobetaine-14, and C7BzO. Optionally, solubilizers can also be included, such as Brij® 98, Brij® 58, Brij® 35, Tween® 80, Tween® 20, Pluronic® L64, Pluronic® P84, non-detergent sulfobetaines (NDSB 201), amphipols (PMAL-C8), and methyl-β-cyclodextrin. Typically, non-denaturing detergents and solubilizers are used at concentrations above their critical micelle concentration (CMC), while denaturing detergents may be added at concentrations below their CMC. For example, non-denaturing lytic detergents can be used at a concentration of about 0.010% to about 10%, e.g., about 0.015% to about 1.0%, e.g., about 0.05% to about 0.5%, e.g., about 0.10% to about 0.30% (final concentration after dilution with the sample). In another embodiment, detergents comprising a hydrophilic polyoxyethylene "head" group linked to a hydrophobic alkane or alkene "tail" group by an ether bond may be preferred. These detergents are commonly specified using notation of the form $C_xE_y$, wherein "x" equals the number of carbons in the alkane or alkene chain, while "y" is the number of oxyethylene monomers ($CH_2CH_2O$) in the polyoxyethylene chain. Detergents of this type wherein x lies within the range of 10-20 and y lies within the range of 8-12 are preferred. Even more preferred are detergents of this type wherein x lies within the range of 12-18 and y lies within the range of 9-11. For example, the alkane-polyoxyethylene or alkene-polyoxyethylene detergent can be selected from the group consisting of Brij® 97, Brij® 96V, Genapol® C-100, Genapol® X-100, nonaethylene glycol monododecyl ether (polidocanol), or a combination thereof.

Enzymes that can be used in lysis solutions include, without limitation, enzymes that digest nucleic acids and other membrane-fouling materials (e.g., proteinase, DNase, neuraminidase, polysaccharidase, Glucanex®, and Pectinee). Other additives that can be used include, without limitation, reducing agents such as 2-mercaptoethanol (2-Me) or dithiothreitol (DTT) and stabilizing agents such as magnesium, pyruvate, and humectants. The lysis solution can be buffered at any pH that is suitable to lyse the desired cells, and will depend on multiple factors, including without limitation, the type of sample, the cells to be lysed, and the detergent used. In some embodiments, the pH can be in a range from about 2 to about 13, e.g., about 6 to about 13, e.g., about 8 to about 13, e.g., about 10 to about 13. Suitable pH buffers include any buffer capable of maintaining a pH in the desired range, e.g., about 0.05 M to about 1.0 M CAPS. For some sample types (e.g., urine), the optimal pH for dissolution of unwanted cells and/or particulates may be from about 2 to about 8.

In one embodiment, the sample and the lysis solution are mixed and then incubated for a sufficient time for lysis and solubilization of cell membranes to occur, e.g., about 1, 2, 3, 4, 5, 10, 15, 20, 25, 30, 40, 50, or 60 seconds, or about 2, 3, 4, 5, 6, 7, 8, 9, 10, 15, or 20 minutes or longer, e.g., about 1 second to about 20 minutes, about 1 second to about 5 minutes, or about 1 second to about 2 minutes. In another embodiment, the sample and lysis solution are incubated from about 30 seconds to about 5 minutes, or from about 1 minute to about 3 minutes. The incubation time will depend on the strength of the lysis solution, e.g., the concentration of the detergent and/or enzymes. In general, milder lysis buffers will require more time and a greater dilution of the sample to fully solubilize non-microbial cells. The strength of the lysis solution can be selected based on the microorganisms known to be or suspected to be in the sample. For microorganisms that are more susceptible to lysis, a mild lysis solution can be used. The lysis can take place at a temperature of from about 0° C. to about 60° C., from about 15° C. to about 40° C., from about 20° C. to about 40° C., or from about 30° C. to about 40° C.

In some embodiments, the lysis conditions (e.g., the solution or the incubation time), as well as the separation and/or interrogation steps, can be sufficient to kill some or all of the microorganisms in the sample. The methods of the present invention are highly versatile and do not require that all microorganisms be alive for the isolation and identification to occur. In certain embodiments, some or all of the microorganisms may be dead, with death occurring before, during, and/or after the steps of the methods being carried out.

Further details and description of the lysis buffers contemplated in the practice of this invention are disclosed in pending U.S. patent application Ser. No. 12/589,929 (now published as US 2010/0129857 A1), filed Oct. 30, 2009, entitled "Methods for Isolation and Identification of Microorganisms," the contents of which are incorporated herein by reference. Additional details and description of the lysis buffers contemplated may be found in pending U.S. patent application Ser. No. 12/589,936 (now published as US 2010/0120085 A1), filed Oct. 30, 2009, entitled "Methods for Separation, Characterization and/or Identification of Microorganisms using Mass Spectrometry," the contents of which are incorporated herein by reference.

Typically, in the practice of this invention, the lysis step is carried out within a container (e.g., a microcentrifuge tube). The container may be any container with sufficient volume to hold a test sample and optionally a lysis solution. In one embodiment, the container can be a microcentrifuge tube. In another embodiment, the separation device disclosed in related U.S. patent application Ser. No. 12/589,969 (now published as US 2010/0120133 A1), filed Oct. 30, 2009, entitled "Separation Device for Use in the Separation, Characterization and/or Identification of Microorganisms", may be used in the practice of this invention. The volume of the container can be about 0.1 ml to about 25 ml, e.g., about 1 ml to about 10 ml, e.g., about 2 ml to about 8 ml. If the lysis step and subsequent isolation or separation step are done on a microscale, the volume of the container can be about 2 µl to about 100 µl, e.g., about 5 µl to about 50 µl. The container can have a closure device attached or may be threaded to accept a closure device (e.g., a cap) such that the container can be hermetically sealed during use. The presence of a closure decreases the risks from handling microorganisms that are or may be infectious and/or hazardous, as well as the risk of contaminating the sample. Furthermore, another possible advantage of the methods of the present invention is the ability to carry out one or more of the steps (e.g., the lysis or filtration steps) with the microorganisms in a sealed container (e.g., a hermetically sealed container). The present methods may avoid the health and safety risks associated with handling of highly virulent microorganisms, such as occurs with recovery of microorganisms from samples for direct testing.

Filtration and Sample Transfer Devices

As previously discussed elsewhere herein, the present invention is also directed to a filtration and sample transfer device operable for separation, capture and accumulation of microorganisms from a test sample by vacuum filtration, and subsequent transfer of the captured and accumulated microorganisms (e.g., as a mass or film) to a test slide or plate for analysis or interrogation of the microorganisms (e.g., by mass spectrometry). In one embodiment, the filtration and sample transfer device comprises an integrated filtration and sample transfer device having a hollow elongated body (e.g., a cylindrical, hexagonal, or similarly shaped elongated hollow tube) having a first end or tip that is provided with, or capped with a filtration material (e.g., a filtration membrane) and a second end adapted for connection to a vacuum system or device. In a preferred embodiment, the filtration material (e.g., a filter membrane) is located adjacent to, and extending from, the first end or tip of the integrated filtration and sample transfer device. For example, the filtration material may be external from (i.e., extending or protruding from) the first end or tip of the elongated body. The present applicants have found that the use of a filtration material that extends from, or protrudes from, the first end of the integrated filtration and sample transfer device allows for the transfer of any isolated and/or accumulated microorganisms, e.g., by smearing or spotting of the sample on a plate or slide.

In one embodiment, the hollow elongated body is made of glass. In another embodiment, the hollow elongated body is made of a rigid, or semi-rigid, plastic material, such as, polypropylene (PP), polycarbonate (PC), polyethylene terephthalate (PET), or other plastic material. In general, the integrated filtration and sample transfer device comprises an elongated generally cylindrical body having a filtration tip diameter of from about 0.5 mm to about 10 mm, from about 1 mm to about 5 mm, or from about 1.5 mm to about 3 mm. In another embodiment, the barrel of the cylinder can flare out to an even larger diameter to be able to contain an even larger volume of filtrate. The filtration and transfer device may have a length of from about 2 cm to about 20 cm, from about 3 cm to about 15 cm, or from about 4 cm to about 10 cm. In one embodiment, the integrated filtration and sample transfer device comprises an elongated cylindrical body having a diameter of about 1.5 mm to about 3 mm, and a length of about 4 cm to about 10 cm. In another embodiment, the integrated filtration and sample transfer device comprises an elongated cylindrical body having an internal volume of from about 0.5 cm$^3$ to about 10 cm$^3$, from about 1 cm$^3$ to about 5 cm$^3$, or from about 1.5 cm$^3$ to about 3.5 cm$^3$. In yet another embodiment, the integrated filtration and sample transfer device comprises an elongated cylindrical body having a diameter of about 1.5 mm to about 3 mm and a length of from about 4 cm to about 10 cm (or a volume from about 0.9 cm$^3$ to about 4.7 cm$^3$).

In one embodiment, the hollow elongated cylindrical tube of the integrated filtration and sample transfer device may be filled, or packed, with an adsorbent. Packing of an adsorbent material behind the membrane is helpful in two ways. First, it provides support, which allowed the membrane to protrude slightly beyond the tip, which Applicants have found allows for a more efficient transfer of microorganisms from the filter material (e.g., a filter membrane) to a slide or target plate. Second, the use of an adsorbent in the filtration and transfer device also allows for the adsorption of the lysate (i.e., culture media and/or cell materials) that has passed through the filtration material. Moreover, Applicants have found that the packing material provides a clear separation zone between the sample lysate and filter membrane, thereby preventing remixing of the lysate filtrate back in contact with the membrane during and after washing, thus preventing recontamination of the clean microbes. In general, any known adsorbent material can be used. For example, in one embodiment, the adsorbent can be a polyester, glass or cellulose fiber or particulate material. In another embodiment, the adsorbent could be an adsorptive resin, a silica gel, a hydrogel, polyacrylic acid or polyacrylamide derivatives, vegetable gums, a molecular sieve, zeolite, or other adsorbents well known to those of skill in the art. In a further embodiment, the adsorbent is cotton.

In accordance with the present invention, the first end or tip of the integrated filtration and sample transfer device is provided with, or capped with, a filter material (or filtration material). For example, as discussed elsewhere herein, the filtration material (e.g., a filter membrane) is located adjacent to, and extending from, the first end or tip of the integrated filtration and sample transfer device. In general, any filter material having pore sizes that retain at least some portions of the microorganisms and allow the lysate to pass through, can be used in the practice of this invention. The filter materials used in the practice of this invention may comprise, filter membranes or depth filters well known in the art. In one embodiment, the filter membrane will have a pore size of from about 0.1 µm to about 30.0 µm, or from about 0.1 µm to about 10.0 µm, or from about 0.1 µm to about 1.0 µm. Exemplified membranes may include, polyethersulfone (PES) membranes (e.g., Supor® 200, Supor® 450, Supor® MachV (Pall-Gelman, Port Washington, N.Y.), Millipore Express PLUS® (Millipore)). Other possible filter materials may include, HT Tuffryn® (polysulfone), GN Metricel® (mixed cellulose ester), Nylaflo® (Nylon), FP Verticel (PVDF), all from Pall-Gelman (Port Washington, N.Y.), and Nuclepore (polycarbonate) from Whatman (Kent, UK). Exemplified depth filter materials may include, type GF/F, GF/C and GMF150 (glass fiber, Whatman), Metrigard® (glass fiber, Pall-Gelman), APIS (glass fiber, Millipore), as well as a variety of cellulose, polyester, polyproplyene or other fiber or particulate filters, so long as the filter media can retain a sufficient number of the target microorganisms to enable analysis. In another embodiment, a charged or modified particulate or fiber filter material, for example, a zeta charged membrane, may be used.

As previously described, the second end of the hollow elongated tube, opposite the first end or tip, of the hollow elongated tube can be attached to a vacuum source or vacuum system, which is operable for providing a vacuum for filtration (i.e., for vacuum filtration). In general, any known means in the art for connecting the filtration and sample transfer device to the vacuum system can be used. For example, the filtration and transfer device can be connected to a vacuum system with the use of a simple vacuum tube, as is well known in the art.

In still another embodiment, the filtration and sample transfer device may further comprise a squeeze bulb for manual application of a vacuum for vacuum filtration. The use of a squeeze bulb may also allow for the use of a back-flush technique for transferring a sufficient quantity of microbes to a slide or plate for analysis by mass spectrometry, as described elsewhere herein. In another embodiment, a syringe and plunger may be used to generate a vacuum. In still another embodiment, the integrated filtration and sample transfer device may use the internally packed adsorbent to provide sufficient capillary action and/or wicking force for filtration and washing (i.e., thereby allowing for passive filtration).

Referring now to FIG. 1, an exemplified embodiment of the integrated filtration and sample transfer device is shown. FIG. 1 illustrates an integrated filtration and sample transfer device 2 comprising a hollow elongated cylindrical tube or body 4 having a first end or tip 6 and a second end 8. The first end or tip 6 is provided with, or capped with a filter or filtration material 9, which operates to capture or accumulate microorganisms when a vacuum or suction is applied to the integrated filtration and sample transfer device 2. In a preferred embodiment the filtration material 9 is adjacent to, and external from (i.e., extends from, or protrudes from), the first end or tip 6 of the elongated cylindrical tube or body 4. The second end 8 is typically connected to a vacuum source or system (not shown). In other embodiments, the second end 8 can be provided with a bulb or a plunger to provide a suction force or fluid flow for filtration. Also as shown, in one possible embodiment, the hollow cylindrical shaped body can be filled, or packed, with an adsorbent 10, as discussed hereinabove. In accordance with this embodiment, the adsorbent itself can provide a capillary action or wicking force that provides the fluid flow for filtration.

Figure 2B:
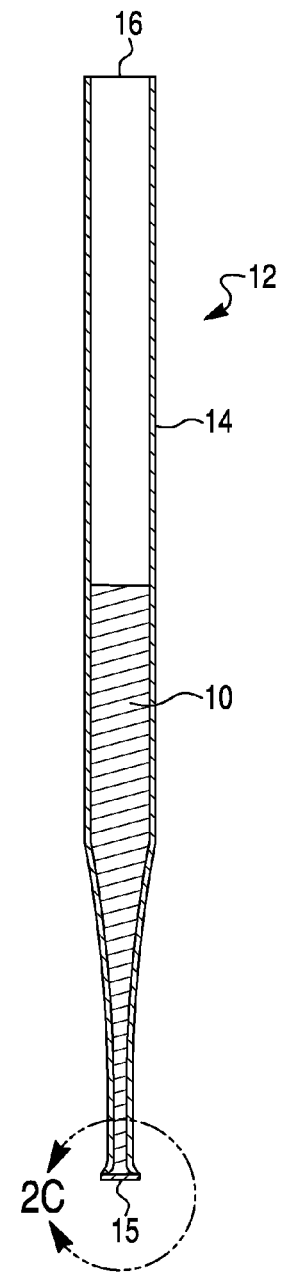
FIG. 2B shows a cross-sectional view of the device and FIG. 2C shows a detailed view of a first end of the device.
Figure 2C:
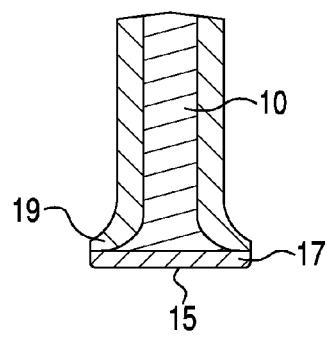

Another design concept is exemplified in FIGS. 2-3. FIGS. 2-3, illustrate an integrated filtration and sample transfer device 12 comprising a hollow elongated cylindrical tube or body 14 having a first end 15 and a second end 16. The first end 15 is provided with, or capped with a filter material 17, which operates to capture or accumulate microorganisms when a vacuum or suction is applied to the integrated filtration and sample transfer device 12. In a preferred embodiment the filtration material 17 is adjacent to, and external from (i.e., extends from, or protrudes from), the first end or tip 15 of the elongated cylindrical tube or body 14. The first end 15 of the integrated filtration and sample transfer device 12 may further comprise a tapered portion 18 and a flared or flattened tip 19. In other embodiments, the second end 16 can be provided with a bulb or a plunger to provide a suction force for filtration. Also as shown, in one possible embodiment, the hollow cylindrical shaped body can be filled, or packed, with an adsorbent 10, as discussed hereinabove. In accordance with this embodiment, the adsorbent itself can provide a capillary action or wicking force that provides fluid flow for filtration.

In another embodiment, the present invention provides a filtration and sample transfer assembly comprising a plurality of integrated filtration and sample transfer devices for the isolation and/or accumulation of a plurality of test samples and for the simultaneous transfer of the plurality of isolated and/or accumulated microorganisms to a container, slide or plate for analyzing said isolated or accumulated sample of said microorganisms to acquire measurements for the characterization and/or identification of said microorganism. Such a device is exemplified in FIGS. 4-5.

Figure 4:
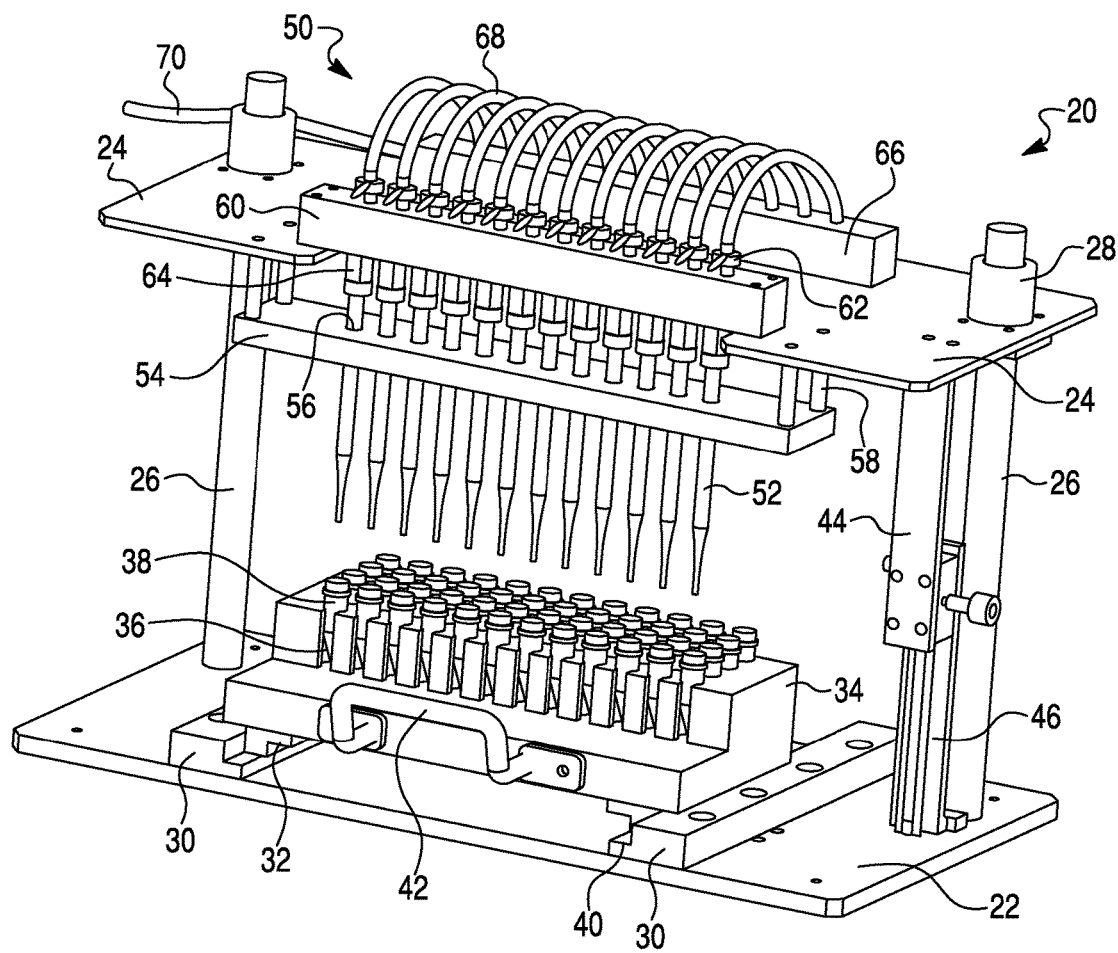
FIG. 4 shows a perspective view of a filtration and sample transfer assembly for the isolation and/or accumulation of microorganisms from a plurality of test samples.
Figure 5:
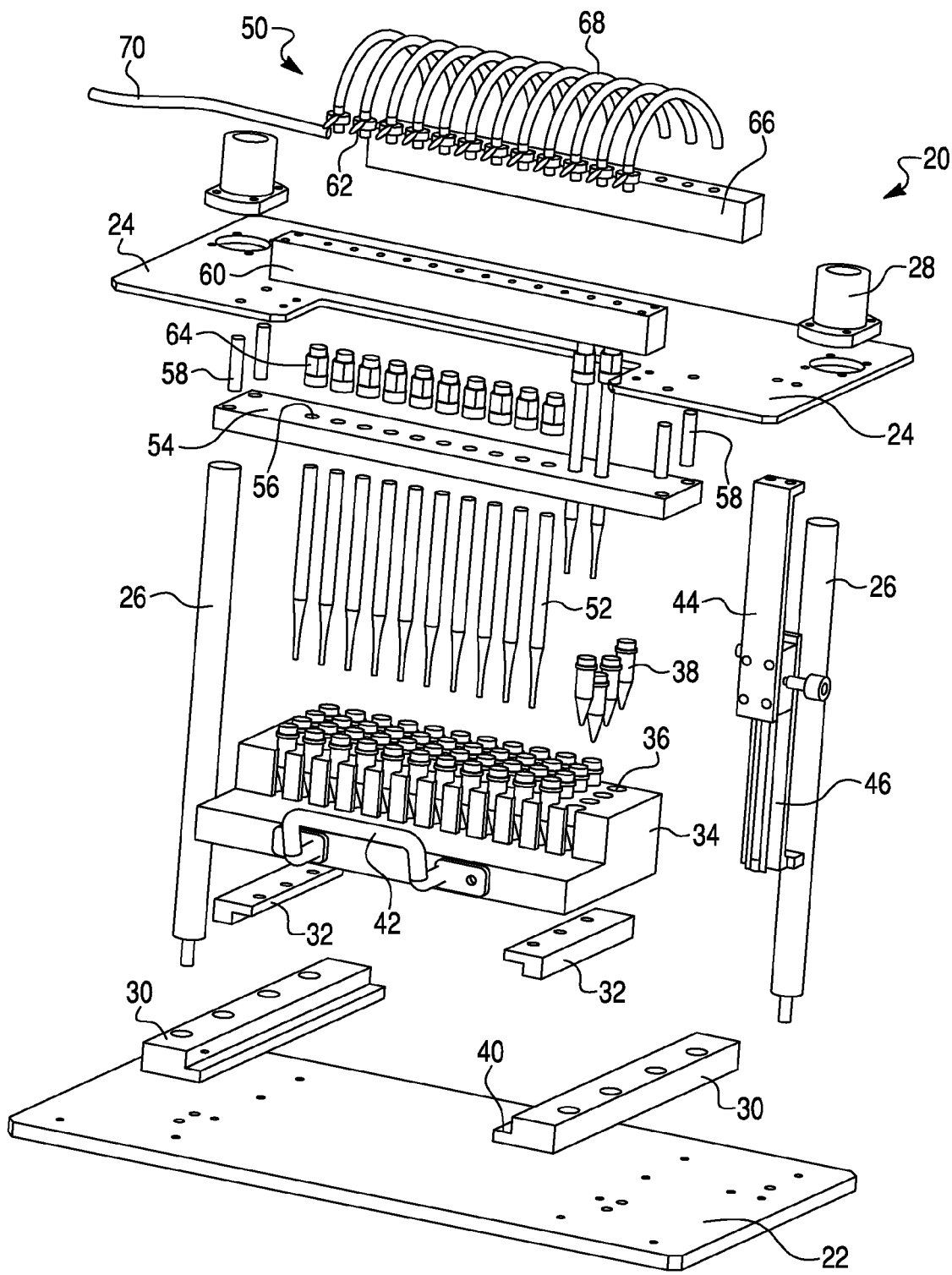
FIG. 5 shows an exploded view of the filtration and sample transfer assembly illustrated in FIG. 4.

As shown in FIGS. 4-5, the filtration and sample transfer assembly 20 comprises a base plate 22, a top plate 24 and a pair of vertical support rods 26 located between, and spacing the top plate 24 from said base plate 22. The top plate 24 further comprises a pair of bearings 28 that allow the top plate to be moved "up" and "down" in a vertical plane along the support rods 26.

As shown, the filtration and sample transfer assembly 20 may further comprises a pair of base rails 30 and corresponding pair of rack guide bars 32, which support a rack assembly 34 having a plurality of wells 36 for holding a plurality of individual tubes (e.g., microcentrifuge tubes) 38. As shown, the base rails 30 may comprise notches 40 that support the rack guide bars 32 and allow for the rack guide bars 32 and thus the rack assembly 34 to slide in a horizontal plane relative to the base plate 22 and base rails 28. Also as shown, the rack assembly 34 may be provided with a handle 42 allowing a user or technician to slide the rack assembly 34 back and forth in a horizontal plane, as guided by the notches 40, along the base rails 30.

Furthermore, as shown in FIGS. 4-5, the filtration and sample transfer assembly 20 may further comprises a vertical axis bracket 44 and a vertical stage 46, which enables the vertical axis bracket 44 to be moved "up" and "down" (i.e., in a vertical plane) along the vertical stage 46. This vertical movement allows the top plate to be moved "up" and "down" (i.e., vertically) along the support rods 26.

The top plate 24 supports a vacuum assembly 50 that supports and provides a vacuum to a plurality of integrated filtration and sample transfer devices 52. As shown in FIGS. 4-5, the vacuum assembly 50 may also comprise a horizontally orientated alignment bar 54 which comprises a plurality of equally spaced locations or holes 56 for holding a plurality of removable integrated filtration and sample transfer devices 52. As shown, in one embodiment, the alignment bar 54 holds or supports a plurality of (e.g., twelve (12)) integrated filtration and sample transfer devices 52. As shown, one or more spacing posts (e.g., four (4)) 58 can be used to space, or support, the alignment bar 54 from the top plate 24.

The vacuum assembly 50 further comprises a valve manifold 60 which comprising a plurality of valves 62 and fittings 64 each of which individually support and connects an integrated filtration and sample transfer device 52 to the vacuum assembly 50. Each individual valve 62 and fitting 64 supported on the valve manifold 60 is individually connected to a vacuum manifold 66 by individual vacuum tubes 68. The vacuum manifold 66 is connected to a vacuum system (not shown) through a main vacuum tube 70.

In operation, a vacuum is provided to each of the individual integrated filtration and sample transfer devices 52 from a vacuum source (not shown) through a vacuum channel. The vacuum channel comprises, in series from the vacuum source, the main vacuum tube 70 and the vacuum manifold 66. From the vacuum manifold 66, the vacuum channel connects to, and supplies a vacuum to individual vacuum channels, wherein each individual vacuum channel comprise, in series from the vacuum source, the individual vacuum tubes 68, valves 62, valve manifold 60, fittings 64, and finally each individual integrated filtration and sample transfer device 52.

In yet another design concept, the present invention provides a two-part sample filtration and transfer system. The two-part sample filtration and transfer system comprises a first part, or a filtration assembly, for the isolation and/or accumulation of a plurality of test samples (i.e., test samples containing or suspected of containing microorganisms) by filtration and a second part, or transfer assembly, for the simultaneous transfer of the plurality of isolated and/or accumulated sample of microorganisms to a slide or plate for analyzing said isolated or accumulated sample of said microorganisms to acquire measurements for the characterization and/or identification of said microorganism. Such a device is exemplified in FIGS. 6-9.

Figure 8:
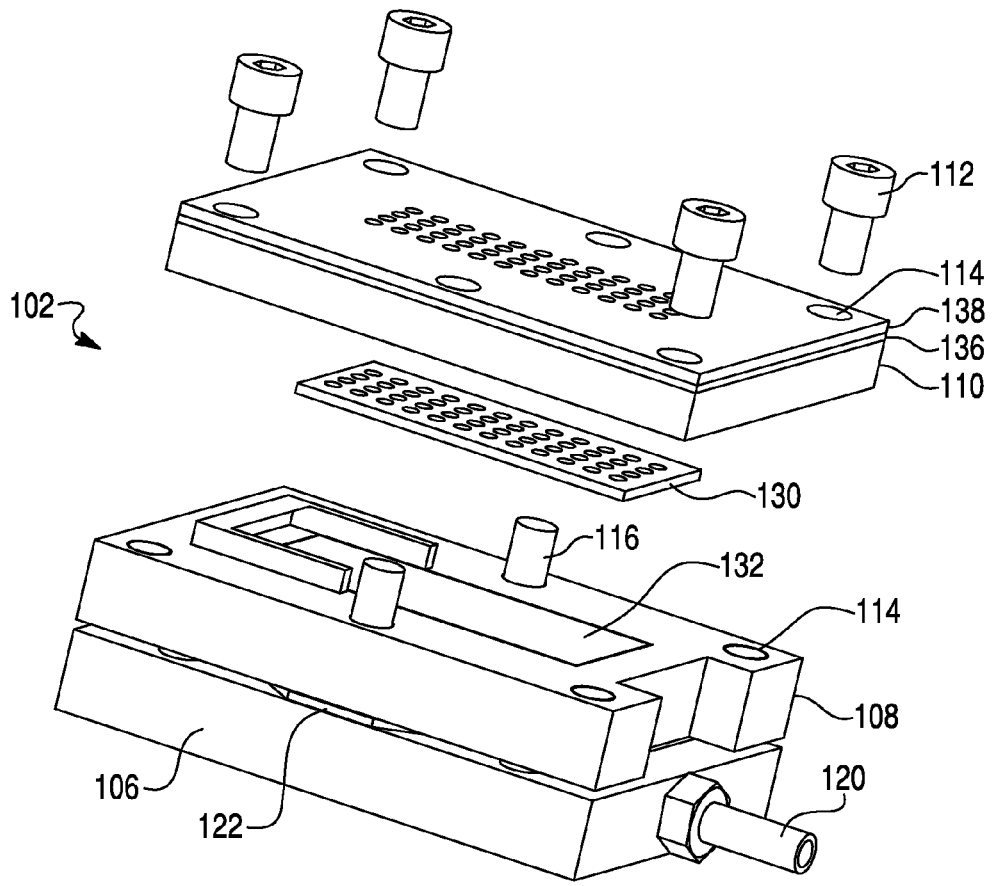
FIG. 8 shows a partial exploded view of the filtration assembly illustrated in FIG. 6.
Figure 9A:
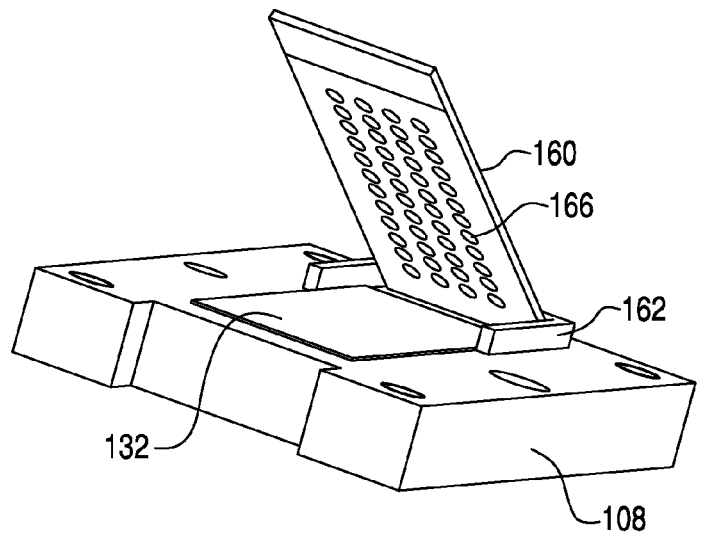
FIGS. 9A-D show perspective views of a transfer assembly, in accordance with the present invention.
Figure 9B:
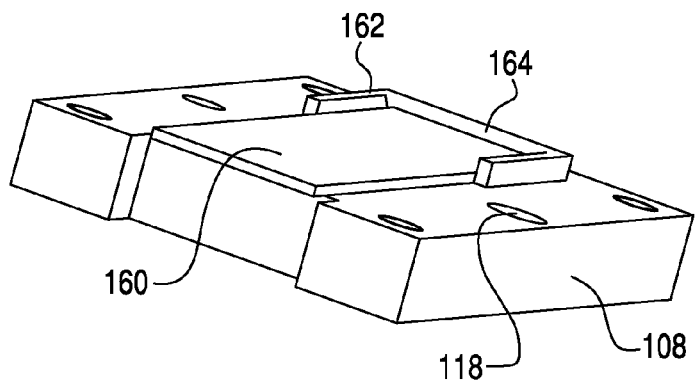
Figure 9C:
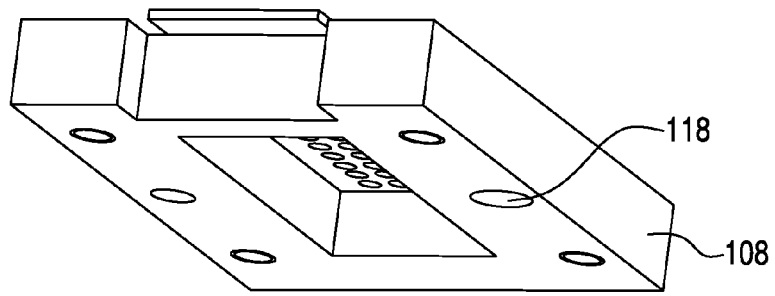
Figure 9D:
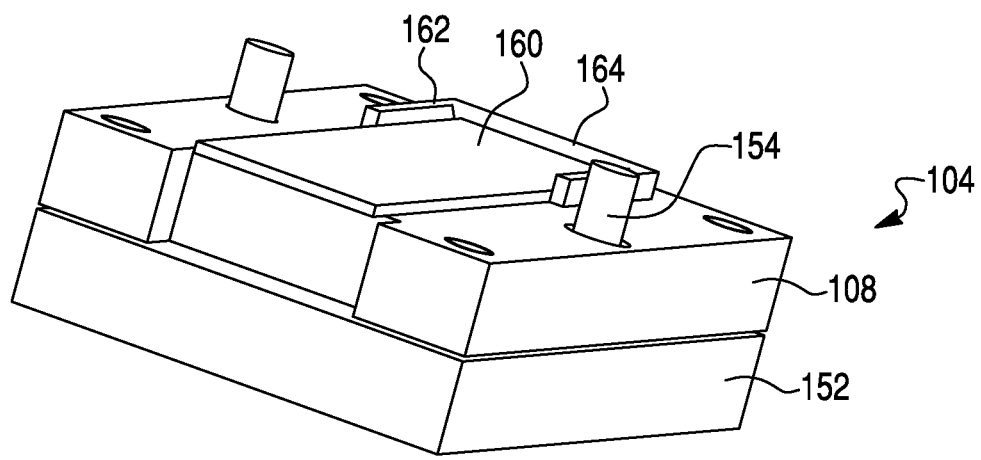
Figure 9E:
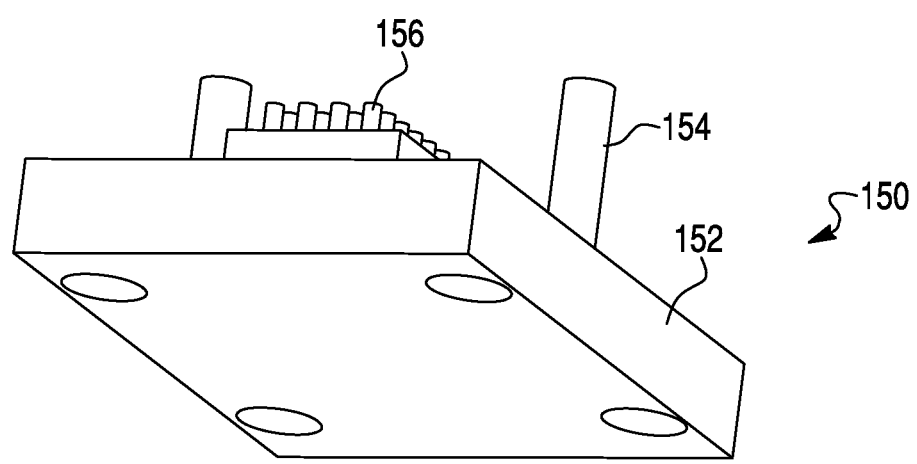

In accordance with this embodiment, the two-part sample filtration and transfer system 100 comprises a first part, or a filtration assembly 102 (see, e.g., FIG. 6), and a second part, or transfer assembly 104 (see, e.g., FIG. 9D). As exemplified in FIGS. 6-12, the two-part sample filtration and transfer system 100 may comprise a 48-well filtration assembly 102 (FIG. 6) and corresponding transfer assembly 104 (FIG. 9D) for transferring up to 48 filtered samples (i.e., isolated and/or accumulated microorganism masses) to a 48-well slide or plate (e.g., a 48-well MALDI-TOF plate) for analysis and subsequent characterization and/or identification of up to 48 individual test samples (i.e., 48 individual isolated and/or accumulated microorganism masses). As one of skill in the art would appreciate, other well configurations are possible and considered part of the present invention.

Figure 6:
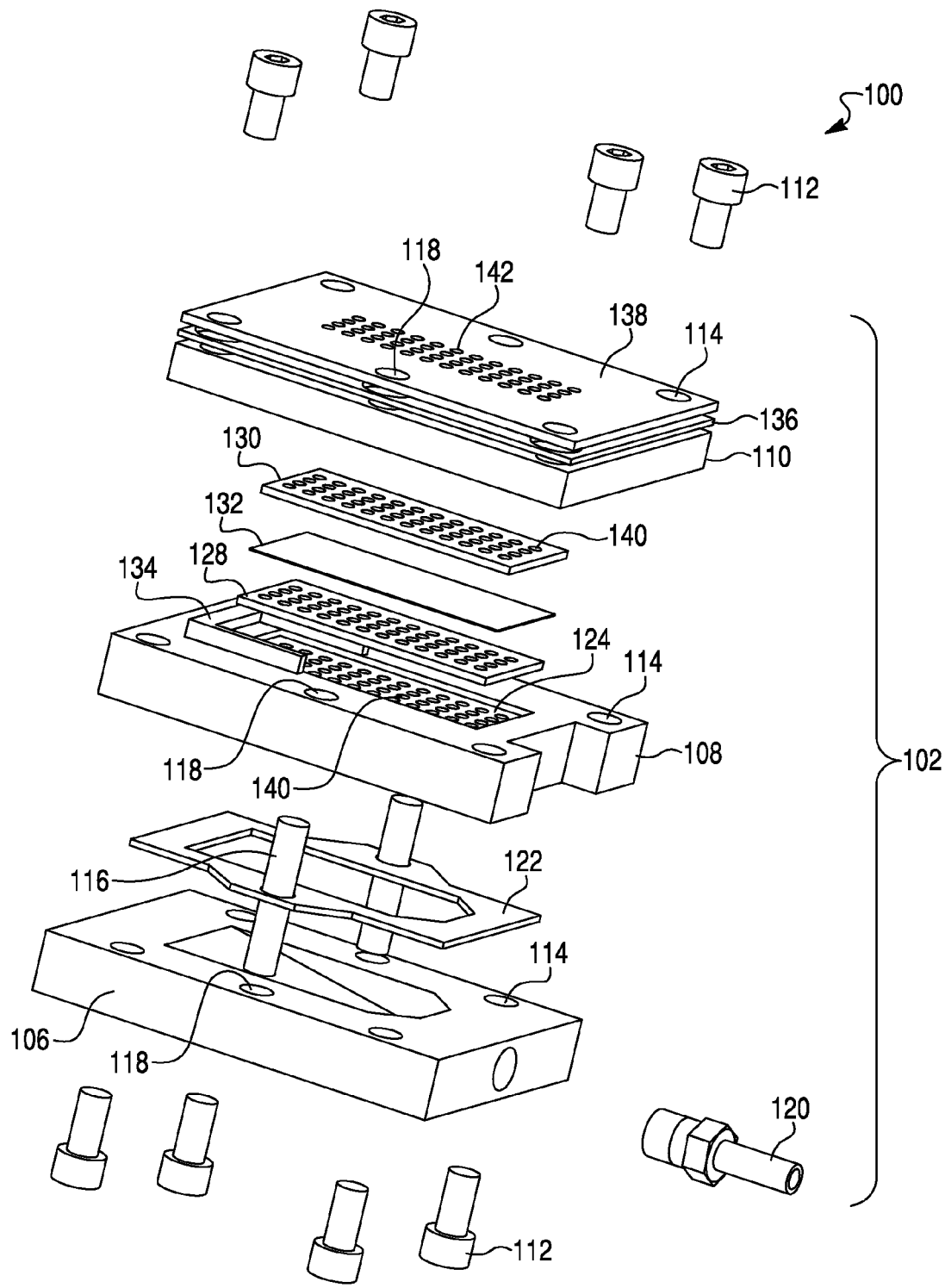
FIG. 6 shows an exploded view of a filtration assembly, which comprises the first part of a two-part sample filtration and transfer system.
Figure 7:
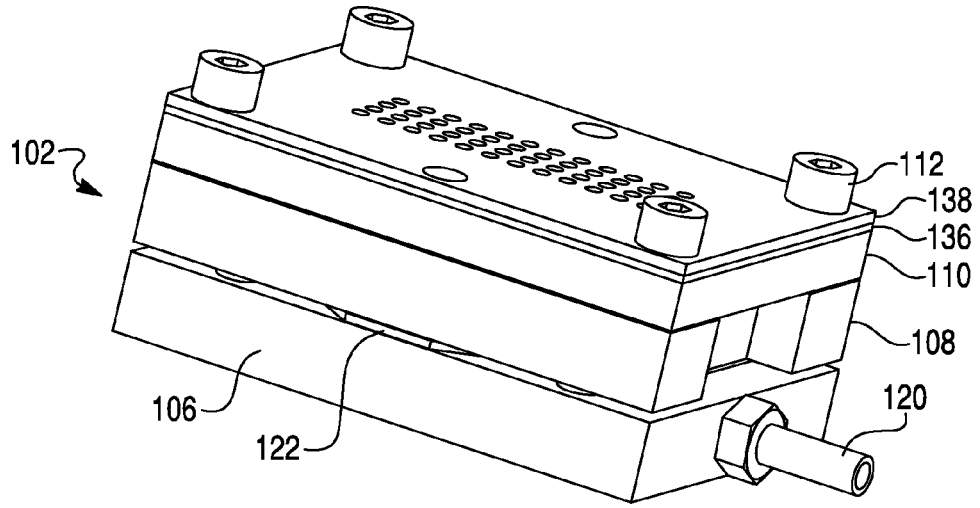
FIG. 7 shows a perspective view of the filtration assembly illustrated in FIG. 6.

As shown in FIGS. 6-8, the filtration assembly 102 comprises a vacuum base plate 106, a bottom gasket block 108 and a top block 110. The base plate 106 is provided with a vacuum fitting 120 for attaching a vacuum lead (e.g., a vacuum tubing) for providing a vacuum to the two-part sample filtration and transfer system 100 from a vacuum source (not shown). The filtration assembly 102 further comprises a plurality of removable bolts 112 and bolt through holes 114 that are provided through the vacuum base plate 106, a bottom gasket block 108 and a top block 110. The bolts 112 and bolt through holes 114 allow for locking of, or holding together, the filtration assembly 102, prior to and during filtration. The filtration assembly 102 is also provided with a pair of alignment pins 116 and alignment through holes 118 that allow for assembly of the filtration assembly 102 prior to locking or holding the assembly 102 together via the bolts 112. As shown in FIG. 6, the alignment through holes 118, like the bolt through holes 114, are also provided through the vacuum base plate 106, a bottom gasket block 108 and a top block 110.

The filtration assembly 102 further comprises a vacuum gasket 122 which provides an airtight seal between the vacuum base plate 106 and bottom gasket block 108.

As shown in FIG. 6, the bottom gasket block 108 contains a filtration cavity 124 that comprises a recess in the top surface of the bottom gasket block 108 and contains therein a plurality of filtration through holes 140. The filtration cavity 124 houses therein a lower gasket 128 and an upper gasket 130, which "sandwich" a filter material 132 (e.g., a filter membrane). Like the vacuum cavity 124, the lower 128 and upper gaskets 130 comprise therein a plurality of filtration through holes 140, which correspond to the filtration through holes contained in the filtration cavity 124. As exemplified in FIG. 6, the filtration cavity 124, lower gasket 128 and upper gasket 130 may comprise 48 corresponding vacuum through holes 140 (again other sample well configurations are possible and contemplated as part of the present invention). The lower 128 and upper gaskets 130 provide an airtight seal allowing for filtration through the filter material in response to vacuum being pulled via the vacuum fitting 120 and vacuum source (not shown).

The top block 110 may further comprise a middle gasket or tape 136 and a top plate 138, as shown for example in FIG. 6. Like the filtration cavity 124, lower gasket 128 and upper gasket 130, the top block 110 middle gasket or tape 136 and a top plate 138 comprise a plurality of holes or sample wells 142, to which a test sample can be added and filtered for isolation and/or accumulation of any microorganisms contained therein. Each of the plurality of holes or sample wells 142 correspond, or align with, each of the vacuum through holes 140 contained in the filtration cavity 124, lower gasket 128 and upper gasket 130. By using a middle gasket or tape 136, the top block 110 and top plate 138 can be made in two separate parts and then assembled with the middle gasket or tape 136, thus allowing for recessed fluid flow channels (as shown in FIGS. 10-12) to be made in each part.

Figure 10:
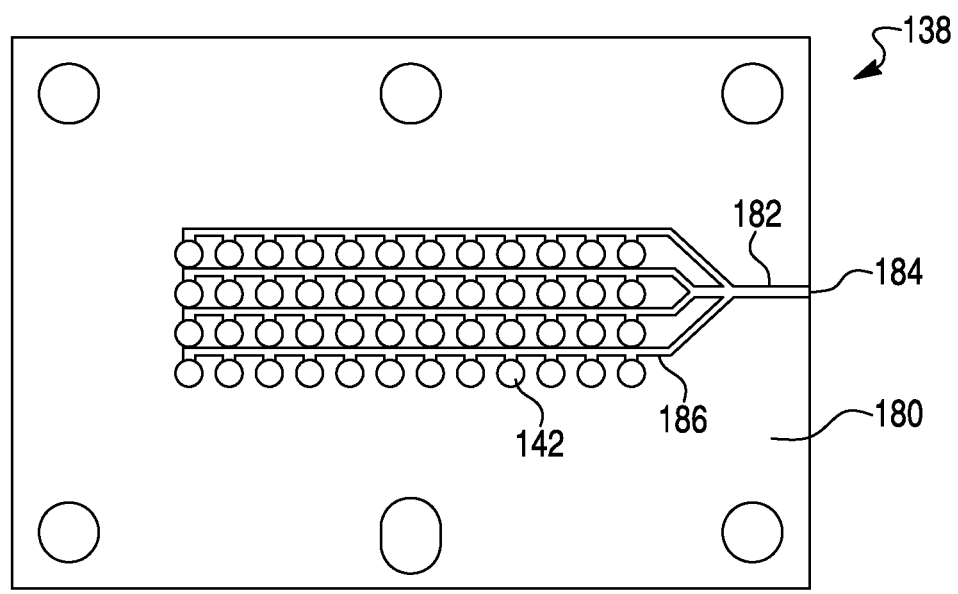
FIG. 10 shows a bottom view of the bottom surface of the top plate of the filtration assembly illustrated in FIG. 6.

As shown in FIG. 10, the bottom surface 180 of top plate 138 may comprise a first fluid flow channel 182. The first fluid flow channel 182 illustrated in FIGS. 10 and 12 comprises an inlet 184 located in a side edge of the top plate 138 and a plurality of distribution channels 186 providing fluid communication between the inlet 184 and a plurality of individual holes or sample wells 142 provided in the top plate 138. As shown more clearly in FIG. 12, the first fluid flow channel 182 leads to, or provides for fluid flow, from the inlet 184 to the top edge of the individual holes or sample wells 142 formed by the top block 110, middle gasket or tape 136 and a top plate 138. The first fluid flow channel 182 can be used to provide a liquid sample to the individual holes or sample wells, for example, the sample wells 142 can be filled with a lytic solution or a wash buffer via the first fluid flow channel 182 (as shown for example by arrow 188).

Figure 11:
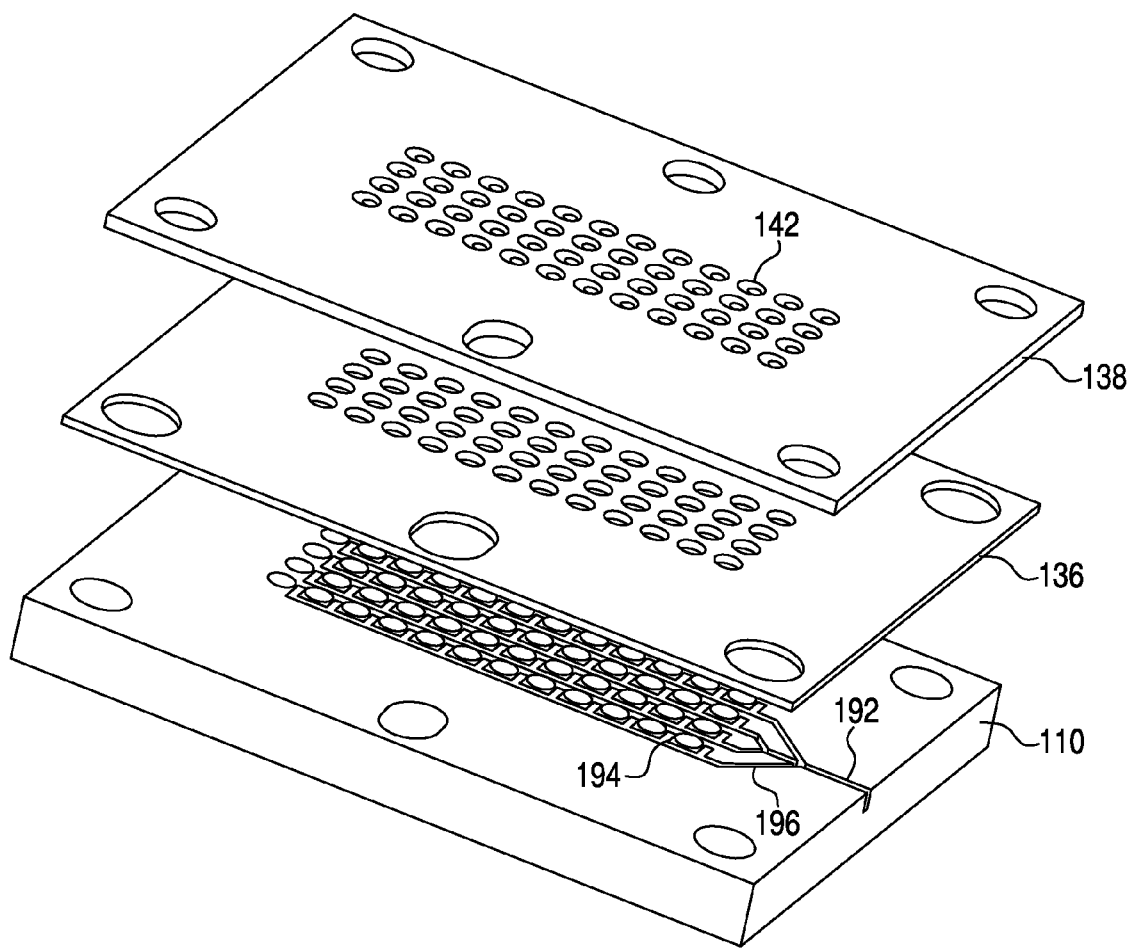
FIG. 11 shows an exploded view of the top plate, middle gasket or tape and a top block of the filtration assembly illustrated in FIG. 6.
Figure 12:
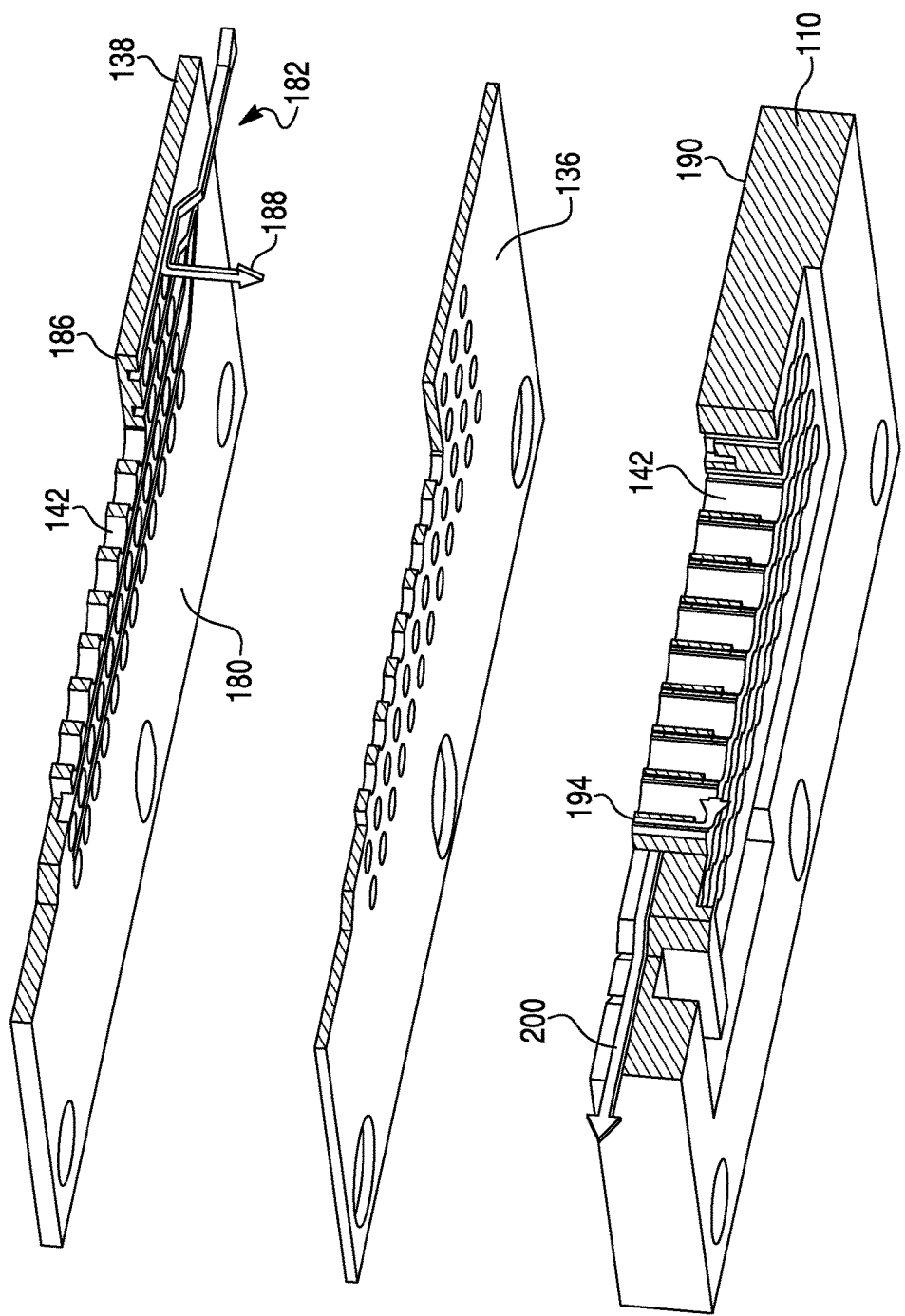
FIG. 12 shows an exploded and cross-sectional view of the top plate, middle gasket or tape and a top block of the filtration assembly illustrated in FIG. 6.

As shown in FIG. 11, the top surface 190 of the top block 110 may comprise a second fluid flow channel 192. The second fluid flow channel illustrated in FIGS. 11-12 comprises a plurality of exit channels 194 that lead from, or connect, the bottom of the plurality of individual holes or sample wells 142 to a plurality of distribution channels 196 contained in the top surface 190 of the top block 110, which in turn lead to an exit port 198 contained in a side edge of the top block 110. The second fluid flow channel 192 can be used to remove fluid from the individual sample wells 142 (as shown for example by arrow 200). For example, if one or more of the wells become blocked or clogged due to accumulation of microorganisms on the filter material, the vacuum source can be turned off, and a second means (e.g., a second vacuum) to provide a force or suction to draw excess fluid out of the sample wells 142 via the second fluid flow channel 192.

In operation, a plurality of test samples (e.g., lysed blood culture samples, in accordance with one possible embodiment of the present invention) can be filtered through the filtration assembly 102 and the microorganism contained therein isolated and/or accumulated on the filter material 132. In accordance with this embodiment, an individual test sample (not shown) can be added to an individual sample wells 142 and a vacuum applied to the filtration assembly 102 from a vacuum source (not shown) via the vacuum fitting 120 for filtration of the lysate through the filter material 132, thereby isolating and/or accumulating any microorganisms on to the filter material 132. This process can be repeated with a different test samples provided in each of the individual holes or sample wells 142 provided in the top block 110.

As shown in FIGS. 9A-9D, the transfer assembly 104 comprises a transfer pin block 150 comprising a base 152, a pair of alignment pins 154 and a plurality of transfer pins 156. In accordance with this embodiment, the transfer pins 156 operate to transfer an isolated and/or accumulated microorganism mass to a slide or plate 160 (e.g., a MALDI-TOF plate) by pressing the filter material (e.g., filter membrane) firmly against the slide or plate 160, thereby transferring the isolated and/or accumulated microorganisms.

The transfer of isolated and/or accumulated microorganisms to a slide or plate 160 is illustrated in FIGS. 9A-9D. In operation, after filtration, the bottom gasket block 108 is removed from the filtration assembly 102. The upper gasket 130 is removed from the vacuum cavity 124 of the bottom gasket block 108 and a slide or plate 160 (e.g., a MALDI-TOF plate) is placed into the vacuum cavity over top of the filter material 132 (see FIGS. 9A and 9B). To provide for accurate placement of the slide or plate 160 into the vacuum cavity 124, a guide 162 and lip 164 are provided on the top surface of the bottom gasket block 108. Aligning the slide or plate 160 with the guide 162 and lip 164 ensures that the sample spots 166 contained on the surface of the slide or plate 160 are properly aligned with the corresponding microorganism spots (not shown) resulting from filtration of individual test samples through individual holes or sample wells 142 provided in the top block 110 (i.e., each holes or sample wells 142 aligns with a corresponding sample spot 166).

Next, the bottom gasket block 108, filter material 132 and slide or plate 160, are transferred to and aligned on top of transfer pin block 150 using the alignment pins 154 and alignment through holes 118 provided in the bottom gasket block 108 (see FIG. 9C). The alignment pins 154 and alignment through holes 118 allow the transfer pins 156 to properly align with the through holes 140 contained in the bottom gasket block 108, and thus allow proper alignment of, in series, the transfer pins, isolated and/or accumulated microorganisms on the filter material 132 and the corresponding sample spots 166 contained on the surface of the slide or plate 160.

Finally, the transfer pins 156 can be pressed into the filter material 132 and slide or plate 160, by known means in the art, to transfer the isolated and/or accumulated microorganisms (resulting from filtration of individual test samples through one or more of the corresponding individual holes or sample wells 142) to the corresponding sample spots 166 contained on the surface of the slide or plate 160 (see FIG. 9D). Subsequently, the slide or plate 160 can be analyzed or interrogated to acquire measurements for the characterization and/or identification of said microorganism, in accordance with the present invention.

Separation, Isolation and/or Accumulation Step

The next step in the method of the present invention (e.g., the step after the sample has been lysed, if a lysing or dissolving step is performed) is a separation, isolation and/or accumulation step. The separation, isolation and/or accumulation step can be carried out to separate and isolate or purify the microorganisms from other components of the sample (e.g., non-microorganisms or components thereof) and to accumulate or capture the microorganisms into a mass that can be transferred to a mass spectrometry slide or plate and subsequently interrogated for identification and/or characterization purposes. The separation, isolation and/or accumulation does not have to be complete, i.e., it is not required that 100% separation occur. All that is required is that the separation, isolation and/or accumulation of the microorganisms from other components of the sample be sufficient to permit analysis or interrogation of the microorganisms without substantial interference from the other components. For example, the separation/isolation can result in an accumulated or captured microorganism mass that is at least about 10, 20, 30, 40, 50, 60, 70, 80, 90, 95, 96, 97, 98, or 99% pure or higher.

In one embodiment, the separation, isolation and/or accumulation step is carried out as a filtration step in which a filtration and sample transfer device (as elsewhere described herein) is placed into the sample (e.g., a lysed sample) in a container and a vacuum applied to the filtration and transfer device, which allow the microorganisms to be separated, isolated and/or accumulated (e.g., the microorganisms can be accumulated or captured on the filtration material (e.g., a filter membrane) of the filtration and transfer device) away from other components that may be present in the sample. In accordance with this embodiment, other components of the sample (e.g., non-microorganisms or components thereof that may be present in the sample medium) pass through the filter or filtration material. Accordingly, this filtration step isolates, separates and/or accumulates the microorganisms away from materials in the sample, such as medium, cell debris, and/or other components that might interfere with analysis or interrogation of the microorganisms (e.g., by mass spectrometry).

Accordingly, in one embodiment, this disclosure describes a novel method to rapidly process microorganisms from a sample (e.g., a positive liquid culture), facilitated by a filtration and sample transfer device, for characterization and/or identification of the microorganism. In one embodiment, the method involves capture and accumulation of microorganisms on, or in a filter material, and subsequent transfer of the accumulated microbes to a slide or target plate for mass spectrometric analysis. Referring to now to FIG. 13, an exemplified method for the separation/isolation, capture and accumulation, and subsequent transfer of microorganisms for mass spectrometric analysis is shown. As shown in FIG. 13, the method involves the following steps: (1) obtaining a test sample known to contain, or that may contain a microorganism (e.g., a positive blood culture) (labeled as step 1); (2) selectively lysing the non-microorganism cells in the test sample, thereby producing a lysed sample (step 2); (3) immersing a filtration and sample transfer device (as described elsewhere herein) into the lysed sample (step 3); (4) applying a vacuum to the filtration and sample transfer device, thereby filtering the lysed sample up through the filter, thereby capturing the microorganism on the filter material of the integrated filtration and transfer device (step 4); (5) transferring the filtration and transfer device to a wash fluid or buffer, for washing the filter (step 5); (6) washing the filter by applying, or pulling a vacuum in the filtration and transfer device, thereby pulling the wash fluid or buffer up through the filter, and thus, washing any microorganisms captured on the filter material (step 6); (7) transferring the filtration and transfer device to a MALDI-TOF target plate (described in more detail below) (step 7); (8) depositing the microorganisms on the surface of the MALDI-TOF target plate (e.g., using a dabbing technique) (step 8); (9) adding matrix solution to the microorganism sample on the plate (described in more detail below) (step 9); and (10) acquiring a mass spectra of the microorganism sample using MALDI-TOF (as described below) (not shown).

Optional Transfer Step

After accumulating or capturing microorganisms on the filtration material (e.g., a filter membrane) of the filtration and transfer device, the next step, in one embodiment of the process, is the transfer and depositing of, the accumulated microorganisms (i.e., as a mass or film) to a slide or target plate for analysis and/or interrogation (e.g., by mass spectrometry). In accordance with the present invention, the filtration and sample transfer device, in addition to providing a device for capturing and accumulating microorganisms from a test sample, also serves as an transfer device, for the transfer and application of microorganisms onto a slide or target plate for mass spectrometry analysis.

In one embodiment, the accumulated microorganisms on the filtration and transfer device can be applied or directly deposited into/onto a container, slide or target plate. In accordance with this embodiment, the filtration and transfer device can be dabbed (e.g., in an up and down vertical manner) into/onto a container, slide or target plate, one or more times, to allow for a sufficient quantity of microbes to be transferred to the container, slide or plate for analysis. In some cases, transfer of sufficient microbes for analysis may require repeatedly dabbing.

In another embodiment, the accumulated microorganisms on the filtration and transfer device can be applied or directly deposited onto a slide or target plate using a back-flush technique. The back-flush technique involves applying gentle back-pressure through the integrated filtration and transfer device (e.g., with a squeeze bulb or folded tubing) so that a small amount of liquid exudes from the tip. The backpressure can be applied while dabbing the device vertically in or on the container, slide or target plate until enough liquid is released to leave approximately 1-2 µl of back-flush suspension behind, thereby transferring a sufficient quantity of microbes for analysis by mass spectrometry.

In yet another embodiment, the accumulated microorganisms on the filtration and transfer device can be applied or directly deposited onto a slide or target plate using a smear technique. The smear technique involves smearing or swiping the filter material of the device across the surface of a slide or target plate, one or more times, to allow for a sufficient quantity of microbes to be transferred to the slide or plate for mass spectrometry analysis. In some cases, transfer of sufficient microbes for mass spectrometry analysis may require repeatedly smearing or swiping of the device on the surface of the slide or target plate.

Analysis, Measurement and/or Interrogation Step

Once the microorganisms have been filtered (e.g., using the filtration and sample transfer devices disclosed herein) for isolation and/or accumulation of the unknown microorganism, the isolated and/or accumulated microorganism mass can be analyzing to acquire measurements for the characterization and/or identification of said microorganism. In one embodiment, the isolated or accumulated sample of said microorganisms can be analyzed using spectroscopic interrogation, e.g., based on intrinsic characteristics of the microorganisms (e.g., intrinsic fluorescence) or the vibrational structure of constituent molecules (e.g., Raman spectroscopy). In another embodiment, the isolated or accumulated microorganisms can be analyzed by mass spectrometry (e.g., MALDI-TOF-MS). Additional details and description of preferred methods for acquiring measurements for the characterization and/or identification of said microorganism may be found in the following U.S. patent applications: (1) Ser. No. 12/589,952 (now published as US 2010/0129858 A1), filed Oct. 30, 2009, entitled "Methods for Separation, Characterization and/or Identification of Microorganisms using Spectroscopy," the contents of which are incorporated herein by reference; (2) Ser. No. 12/589,976 (now published as US 2010/0156609 A1), filed Oct. 30, 2009, entitled "Methods for Separation, Characterization and/or Identification of Microorganisms using Raman Spectroscopy," the contents of which are incorporated herein by reference; and (3) Ser. No. 12/589,936 (now published as US 2010/0120085 A1), filed Oct. 30, 2009, entitled "Methods for Separation, Characterization and/or Identification of Microorganisms using Mass Spectrometry," the contents of which are incorporated herein by reference.

In some embodiments, the isolated and/or accumulated sample or microorganism mass can be interrogated spectroscopically. In one embodiment, optical spectroscopic methods can be used to analyze one or more intrinsic properties of the microorganisms, e.g., a property present within the microorganism in the absence of additional agents, such as stains, dyes, binding agents, etc. In other embodiments, the optical spectroscopic methods can be used to analyze one or more extrinsic properties of the microorganisms, e.g., a property that can only be detected with the aid of additional agents. The interrogation can be carried out using, for example, fluorescence spectroscopy, diffuse reflectance spectroscopy, infrared spectroscopy, terahertz spectroscopy, transmission and absorbance spectroscopy, Raman spectroscopy, including Surface Enhanced Raman Spectroscopy (SERS), Spatially Offset Raman spectroscopy (SORS), transmission Raman spectroscopy, transmission Raman spectroscopy, and/or resonance Raman spectroscopy. To enhance Raman (SERS) and fluorescence signals, microorganisms could either be coated with gold and/or silver nanoparticles prior to centrifugation, and/or the inner optical surface could be pre-coated with metal colloids of particular size and shape (refs: Lakowicz, *Anal. Biochem.* 337:171 (2005) for fluorescence; Efrima et al., *J. Phys. Chem. B.* (*Letter*) 102:5947 (1998) for SERS). In one embodiment, the isolated and/or accumulated sample or microorganism mass is analyzed to obtain measurements useful for characterization and/or identification of the unknown microorganism, while the sample or mass remains in/on the filtration and/or sample transfer device. In another embodiment, as discussed elsewhere herein, the sample or microorganism mass can be analyzed after transfer to a container, plated or slide.

In other embodiments, after the sample has been filtered (e.g., using a filtration and sample transfer device, as disclosed elsewhere herein), a portion of the sample is transferred into/onto a container, plate or slide for introduction into a mass spectrometer. A highly absorptive substance is deposited on top of the sample (e.g. matrix); this material has a very high optical absorption coefficient with respect to the laser frequency that is used to ionize the sample (e.g. for a nitrogen laser the emission wavelength is 337 nm so the absorptive material would have a large absorption coefficient at a wavelength of 337 nm). After the sample and absorptive substance have dried, the plate is inserted into the mass spectrometer. After the time required to pump the sample down (i.e. remove atmospheric gases from the sample so that it is in an environment of 10-5 to 10-7 torr), the sample is introduced into the ionization chamber of the mass spectrometer. The sample is aligned with the system. When optimal alignment is achieved, the nitrogen laser is pulsed. The absorption of the laser energy by the matrix causes it to ablate from the plate's surface due to the high energy deposited. As a side effect, portions of the microorganism cell are also vaporized and ionized in the process. These ions are accelerated to a known kinetic energy by the generation of an electrostatic field between the plate and the entrance to the mass spectrometer's flight tube (i.e. this portion of the system is the mass/charge discriminator). All singly charged ions, regardless of mass, will have the same kinetic energy at the entrance to the flight tube, but they will have velocities that are inversely proportional to their masses. From there, ions move down the flight tube towards the detector, and lighter ions will arrive before heavier ions (the flight tube is the mass/charge discriminator). The detector generates an electrical charge every time an ion impacts the detector. The output of the detector is digitized and the output displays mass/charge ratio on one axis and number of impacts on the other axis. In other embodiments, the transferred microorganisms in the mass can be interrogated using mass spectrometry techniques, such as MALDI-TOF mass spectrometry, desorption electrospray ionization (DESI) mass spectrometry, GC mass spectrometry, LC mass spectrometry, electrospray ionization (ESI) mass spectrometry and Selected Ion Flow Tube (SIFT) spectrometry.

In some embodiments of the invention, characterization and/or identification of the microorganisms in the isolated sample or mass need not involve identification of an exact species. Characterization encompasses the broad categorization or classification of biological particles as well as the actual identification of a single species. Classification of microorganism from an isolated sample or mass may comprise determination of phenotypic, morphologic and/or metabolic characteristics for the microorganism. For example, characterization of the biological particles may be accomplished based on observable differences, such as, composition, shape, size, clustering and/or metabolism. In some embodiments, classification of the biological particles of interest may require no prior knowledge of the characteristics of a given biological particle but only requires consistent correlations with empiric measurements thus making this method more general and readily adaptable than methods based on specific binding events or metabolic reactions. As used herein "identification" means determining to which family, genus, species, and/or strain a previously unknown microorganism belongs to. For example, identifying a previously unknown microorganism to the family, genus, species, and/or strain level.

In some instances, characterization encompasses classification models which provide sufficient useful information for action to be taken. Additional details and description of contemplated classification models may be found in U.S. patent application Ser. No. 12/589,936 (now published as US 2010/0120085 A1), filed Oct. 30, 2009, entitled "Methods for Separation, Characterization and/or Identification of Microorganisms using Mass Spectrometry," the contents of which are incorporated herein by reference. As described therein, the preferred classification models comprise grouping into one or more of the following: (1) Gram Groups; (2) Clinical Gram Groups; (3) Therapeutic Groups; and (4) Functional Groups.

Kit.

The present invention is also directed to a kit for the isolation, accumulation and/or purification of microorganisms from a test sample. In its simplest form, the kit of the present invention will include: (1) optionally a lysis solution or buffer for the selective lysis of non-microorganism known to be present or that may be present in a test sample; (2) an integrated filtration and sample transfer device (as described elsewhere herein) for the isolatation, accumulation and/or purification of microorganisms that may be in test sample, and for the subsequent harvesting and transfer of microorganisms; and (3) at least one wash fluid or buffer for washing the isolated, accumulated and/or purified microorganism sample. The integrated filtration and sample transfer device used in the kit if described in detail elsewhere herein.

Optionally, the kit may include a selective lysis solution or buffer to selectively lyse or dissolve undesired cells and/or particulates that may be present in the test sample, e.g., blood cells and/or tissue cells. Cells and/or particulates may be lysed or dissolved to permit separation and/or isolation of microorganisms from other components of the sample. The separation and/or isolation of microorganisms from other components prevents interference during any subsequent direct testing applications, for example, analysis or interrogation for the characterization and/or identification of the microorganism (e.g., by mass spectrometry) or the performance of broad-range microbial PCR on blood culture broth. However, if non-microorganism cells are not expected to be present in the sample or not expected to interfere with any subsequent testing, the lysis step may not need to be carried out.

Typically, the selective lysis solution can be used to lyse or dissolve non-microorganism cells that may be present in the test sample. However, in some embodiments, the selective lysing of specific classes of microorganisms may be desirable and thus can be carried out according to the methods described herein and as are well known in the art. For example, a class of undesired microorganisms can be selectively lysed, e.g., yeast are lysed while bacteria are not or vice versa. In another embodiment, the desired microorganisms are lysed in order to separate a particular subcellular component of the microorganisms, e.g., cell membranes or organelles. In one embodiment, all of the non-microbial cells are lysed. In other embodiments, a portion of the non-microbial cells are lysed, e.g., enough cells to prevent interference with the interrogation step. The lysing of cells may be carried out by any method known in the art to be effective to selectively lyse cells with or without lysing microorganisms, including, without limitation, addition of a lysis solution, sonication, osmotic shock, chemical treatment, and/or a combination thereof.

The lysis solution is one that is capable of lysing cells, e.g., non-microorganism cells (e.g., by solubilizing or dissolving eukaryotic cell membranes) and/or microorganism cells. In one embodiment, the lysis solution can comprise one or more detergents, optionally one or more enzymes, or a combination of one or more detergents and one or more enzymes, and can further include additional agents. In one embodiment, the detergent can be a non-denaturing lytic detergent, such as Triton® X-100, Triton® X-100-R, Triton® X-114, NP-40, Genapol® C-100, Genapol® X-100, Igepal® CA 630, Arlasolve™ 200, Brij® 96/97, CHAPS, octyl β-D-glucopyranoside, saponin, and nonaethylene glycol monododecyl ether (C12E9, polidocenol). Optionally, denaturing lytic detergents can be included, such as sodium dodecyl sulfate, N-laurylsarcosine, sodium deoxycholate, bile salts, hexadecyltrimethylammonium bromide, SB3-10, SB3-12, amidosulfobetaine-14, and C7BzO. Optionally, solubilizers can also be included, such as Brij® 98, Brij® 58, Brij® 35, Tween® 80, Tween® 20, Pluronic® L64, Pluronic® P84, non-detergent sulfobetaines (NDSB 201), amphipols (PMAL-C8), and methyl-β-cyclodextrin. Typically, non-denaturing detergents and solubilizers are used at concentrations above their critical micelle concentration (CMC), while denaturing detergents may be added at concentrations below their CMC. For example, non-denaturing lytic detergents can be used at a concentration of about 0.010% to about 10%, e.g., about 0.015% to about 1.0%, e.g., about 0.05% to about 0.5%, e.g., about 0.10% to about 0.30% (final concentration after dilution with the sample). In another embodiment, detergents comprising a hydrophilic polyoxyethylene "head" group linked to a hydrophobic alkane or alkene "tail" group by an ether bond may be preferred. These detergents are commonly specified using notation of the form $C_xE_y$, wherein "x" equals the number of carbons in the alkane or alkene chain, while "y" is the number of oxyethylene monomers ($CH_2CH_2O$) in the polyoxyethylene chain. Detergents of this type wherein x lies within the range of 10-20 and y lies within the range of 8-12 are preferred. Even more preferred are detergents of this type wherein x lies within the range of 12-18 and y lies within the range of 9-11. For example, the alkane-polyoxyethylene or alkene-polyoxyethylene detergent can be selected from the group consisting of Brij® 97, Brij® 96V, Genapol® C-100, Genapol® X-100, nonaethylene glycol monododecyl ether (polidocanol), or a combination thereof.

Enzymes that can be used in lysis solutions include, without limitation, enzymes that digest nucleic acids and other membrane-fouling materials (e.g., proteinase, DNase, neuraminidase, polysaccharidase, Glucanex®, and Pectinex®). Other additives that can be used include, without limitation, reducing agents such as 2-mercaptoethanol (2-Me) or dithiothreitol (DTT) and stabilizing agents such as magnesium, pyruvate, and humectants. The lysis solution can be buffered at any pH that is suitable to lyse the desired cells, and will depend on multiple factors, including without limitation, the type of sample, the cells to be lysed, and the detergent used. In some embodiments, the pH can be in a range from about 2 to about 13, e.g., about 6 to about 13, e.g., about 8 to about 13, e.g., about 10 to about 13. Suitable pH buffers include any buffer capable of maintaining a pH in the desired range, e.g., about 0.05 M to about 1.0 M CAPS. For some sample types (e.g., urine), the optimal pH for dissolution of unwanted cells and/or particulates may be from about 2 to about 8.

The kit will also include at least one wash fluid or buffer for washing the isolated, accumulated and/or purified microorganism or microorganism mass on the filter material. The wash buffer can be used to further separate, isolate or purify the accumulated or captured microorganisms by "washing" away other components (e.g., media, media components, cell-debris, non-microorganisms or components thereof) that may be present in the test sample. As one of skill in the art would readily appreciate, the use of a wash buffer allows, or facilitates, washing away (or pass through the filter material) media, media components, cell-debris, non-microorganisms or components thereof, which may otherwise interfere with subsequent testing (e.g., mass spectrometric analysis). The wash buffer may also be used to rapidly neutralize the alkaline pH of the lysis solution. In general, any known wash fluid or buffer can be included in the kit. For example, the wash buffer could be distilled water. In another embodiment, the wash buffer could be a pH buffer capable of maintaining a pH suitable for microorganisms, such as a phosphate, MOPS or TRIS buffer. For example, the wash buffer could be a 0.01 M to about 0.2 M phosphate solution, pH 6.0 to 7.5

Furthermore, the kit may also comprise a filtration device, vacuum source and/or a vacuum interface. The filtration device can be adapted for attachment to a vacuum source or vacuum system, which is operable for providing a vacuum for filtration (i.e, for vacuum filtration). In general, any known means in the art for connecting the filtration and sample transfer device to the vacuum system can be used. For example, the filtration and transfer device can be connected to a vacuum system with the use of a simple vacuum tube, as is well known in the art. For example, the kit may comprise a side-arm vacuum flasks (see FIGS. 2-3, number 2) with reusable filter holder or a manifold (see FIG. 3, number 4) with a filtrate reservoir and a plurality of reusable filter holders (see FIG. 3, number 6). In still other embodiments, the kit may further comprise additional components for filtration, for example, the kit may comprise one or more tubes, clamps, valves or vacuum traps. In another embodiment, the kit may comprise one or more disposable filtration devices having a built in filtration membrane. In these disposable devices, filtration may be driven by either a vacuum source of by centrifugation.

The kit may also include a container (e.g., a tube), within which the lysis step can be carried out. The container may be any container with sufficient volume to hold a test sample and optionally a lysis solution. In one embodiment, the container can be a tube. In another embodiment, the separation device disclosed in related U.S. patent application Ser. No. 12/589,969 (now published as US 2010/0120133 A1), filed Oct. 30, 2009, entitled "Separation Device for Use in the Separation, Characterization and/or Identification of Microorganisms", may be included in the kit. The volume of the container can be about 0.1 ml to about 25 ml, e.g., about 1 ml to about 10 ml, e.g., about 2 ml to about 8 ml. If the lysis step and subsequent isolation or separation step are done on a microscale, the volume of the container can be about 2 μl to about 100 μl, e.g., about 5 μl to about 50 μl. The container can have a closure device attached or may be threaded to accept a closure device (e.g., a cap) such that the container can be hermetically sealed during use. The presence of a closure decreases the risks from handling microorganisms that are or may be infectious and/or hazardous, as well as the risk of contaminating the sample. For example, the kit may contain from 1 to 500 containers (e.g., tubes), within which the lysis step can be carried out. In other embodiments, the kit may contain from 1 to 100, from 10 to 80, or from 10 to 50, containers within which the lysis step can be carried out. In other embodiments, the kit may contain 20, 50, 75 or 100 containers within which the lysis step can be carried out.

The kit may also include one or more test slides or target plates for analysis or interrogation of the microorganisms (e.g., by mass spectrometry). In accordance with this embodiment, the accumulated microorganisms on the integrated filtration and transfer device can be applied or directly deposited into/onto a test slide or target plate for subsequent testing. In accordance with this embodiment, the isolated, accumulated and/or purificated microorganisms on the integrated filtration and transfer device can be transferred or deposited onto a slide or plate (e.g., by using a dabbing, back-flushing and/or smearing technique) onto the slide or target plate to allow for subsequent testing and/or analysis, as described in more detail elsewhere herein. For example, the kit may contain from 1 to 500 test slides or target plates. In other embodiments, the kit may contain from 1 to 100, or from 10 to 80, or from 20 to 50 test slides or target plates. In other embodiments, the kit may contain 20, 50, 75 or 100 test slides or target plates for subsequent testing and/or analysis.

In general, the kit can be configured for processing any number of test samples (i.e., for the isolation, accumulation and/or purification of microorganisms from any specific number of test samples). For example, the kit can be configured for processing (isolating, accumulating and/or purifying microorganisms) from about 1 to about 1000 test samples, from about 10 to about 500 test samples, or from about 10 to about 100 test samples. In another embodiment, the kit could be configured for processing from about 10 to about 80 test samples, from about 20 to about 60 test samples, or about 50 test samples.

The present invention is further detailed in the following examples, which are offered by way of illustration and is not intended to limit the invention in any manner. Standard techniques well known in the art or the techniques specifically described below are utilized.

EXAMPLES

Example 1. Lysis Filtration-Mass Spectrometry Using an Integrated Filtration and Transfer Device Microorganisms were "seeded" with an inoculum of approximately 40 or 400 CFU in a 1.0 ml suspension of each test strain into BacT/ALERT® SA or SN bottles containing 10 mLs of human blood. The seeded test samples were then mixed by inverting the bottles several times and incubated in a BacT/ALERT® 3D Combo cabinet and monitored for detection of microbial growth within the bottle.

Blood culture broth samples were removed from bottles within a few minutes of being flagged positive by the BacT/ALERT® 3D Microbial Detection System. If the bottle was not processed immediately, it was stored at 2-8° C., and later warm broth to ambient temperature by placing the bottle in a 37° C. water-bath for 5-15 minutes prior to testing. Positive blood cultures Broth samples were processed to separate microorganisms from blood and media components that could interfere with subsequent analysis as follows:

(1) using a 1 mL syringe and 18 G needle, 0.5 mL of positive broth was transferred into a clean 1.5 ml microfuge tube;
(2) 0.25 ml of Lysis Buffer (0.45% w/v Brij-97+0.3M CAPS, pH 11.7 (0.2 um filtered, stored at 2-8° C.)) was added to the broth, and mixed by gentle aspiration/dispensation 5-6 times, being careful to avoid bubble formation as much as possible, and the mixture was incubated for 2:00 to 2:15 minutes at room temperature, thereby generating a lysed sample, or lysate;
(3) after the lysis incubation, the tip of an integrated filtration and transfer device was immerse approximately 3-5 mm into the lysate and vacuum aspirated for 2:00 to 2:15 minutes at room temperature, as the liquid is drawn in the depth of the integrated filtration and transfer device was adjusted to maintain a depth of approximately 3-5 mm;
(4) after the sample was vacuum filtered for 2:00 to 2:15 minutes, the filtration and transfer device was moved to a container containing a first wash solution (Brij/Saline (0.45% w/v NaCl+0.05% Brij 97)), immersed, and vacuum aspirated for 4:00 to 4:15 minutes at room temperature;
(5) after the first wash step, the filtration and transfer device was moved to a second container containing a second was solution (deionized water), immersed in the wash first wash solution, and vacuum aspirated for 4:00 to 4:15 minutes at room temperature;
(6) the washed microbes were then applied to one or more spots on MALDI-TOF target plates using a dabbing technique of repeated vertical dabbing, or alternately backflushing, until a visible residue or 1-2 µl of suspension was deposited;
(7) the spots were dried and then 1 µl of matrix was added;
(8) after all samples for a given target plate were applied and dried, the spots were analyzed by MALDI-TOF MS.

Example 2. Lysis-Filtration Mass Spectrometry Using an Integrated Filtration and Transfer Device Comprising Membrane Filters Forty-four (44) microorganism isolates were grown, processed and analyzed by MALDI-TOF MS as described in Example 1, using an integrated filtration and sample transfer device employing Supor® 450 (Pall-Gelman, Port Washington, N.Y.) as a filter material and using a back flush technique to deposit accumulated microorganism onto a MALDI-TOF plate.

After all microorganism specimens had completely dried, MALDI-TOF Mass Spectra were acquired for each over a mass/charge range of 2,000-34,000 on an Axima Assurance MALDI-TOF Mass Spectrometer (Shimadzu Biotech North America, Maryland).

After acquisition of each mass spectrum, a table of mass peaks was input into the "Saramis" microorganism identification software (bioMerieux Inc., USA) for analysis. This software is built upon a database of MALDI-TOF Mass Spectra collected of agar-grown microorganisms.

The Table 1 below shows the ID results using an integrated filtration and transfer device made with a Supor 450 membrane.

TABLE 1

Supor 450 Device—Backflush Technique—SA Bottles

| Isolate | ID Conf. | Isolate | ID Conf. |
|---|---|---|---|
| E. coli, 104471 | 3 | S. epidermidis, D055 | 2 |
| E. coli, 100257 | 4 | S. epidermidis, D069 | 0 |
| E. coli, D104 | 4 | S. epidermidis, D082 | 4 |
| E. coli, D168 | 4 | S. epidermidis, D092 | 3 |
| P. aeruginosa, 105716 | 4 | E. faecalis, D149 | 4 |
| P. aeruginosa, 107930 | 4 | E. faecalis, D135 | 3 |
| E. aerogenes, 104098 | 3 | E. faecium, 13243 | 0 |
| E. aerogenes, 107930 | 3 | E. faecium, 14334 | 0 |
| K. pneumoniae, 108902 | 4 | E. faecium, D068 | 0 |
| K. pneumoniae, 105245 | 4 | S. pneumoniae, 7265 | 2 |
| S. aureus, 10754 | 0 | S. pneumoniae, 14226 | 0 |
| S. aureus, 8816 | 4 | S. pneumoniae, D013 | 0 |
| S. aureus, 7537 | 4 | S. pyogenes, 11629 | 0 |
| S. aureus, 7623 | 0 | S. pyogenes, 11620 | 0 |
| S. aureus, D164 | 2 | S. pyogenes, 11631 | 0 |
| S. aureus, D076 | 2 | S. pyogenes, 12897 | 0 |
| S. aureus, D116 | 3 | C. albicans, 303070 | 4 |
| S. aureus, D176 | 2 | C. albicans, 18804 | 3 |
| S. epidermidis, 13298 | 0 | C. albicans, 302611 | 4 |
| S. epidermidis, D011 | 0 | C. albicans, 304765 | 0 |
| S. epidermidis, D036 | 3 | C. albicans, 304771 | 0 |
| S. epidermidis, D042 | 0 | C. albicans, 304776 | 3 |

ID Confidence Ratings
4 = 99.9%
3 = 85-99.8%
2 = Species ID <85%, or Genus or Family ≥85%
0 = No ID As shown in Table 1, 22/44 (50%) were given a correct ID to good confidence, while 61% were identified to at least some level.

Although the success rate with this experiment was not yet perfect, it demonstrates that the concept is very promising. This set of microorganisms was chosen because they were challenging to ID directly from blood culture by previous centrifugal methods, and therefore provide a stringent test.

There are many reasons why these first tests may not have provided strong IDs in all cases. One possibility is that there was insufficient cell mass, another possibility is that the cells deposited were of insufficient purity, or there could be a combination of both.

If cell mass is the issue, then other membranes, or even depth filters not yet investigated, could capture a greater number of cells. Another possibility is to increase the capture time/volume so as to accumulate a greater mass.

Example 3. Lysis-Filtration Mass Spectrometry Using an Integrated Filtration and Transfer Device Comprising Depth Filters Forty-six (46) microorganism isolates were grown, processed and analyzed by MALDI-TOF MS as described in Example 1, using an integrated filtration and sample transfer device employing depth filters (Whatman GF/F filter (nominal 0.7 micron) and Metrigard (Pall-Gelman) filters (nominal 0.5 micron with acrylic binder)) as a filter material rather than membranes.

Integrated filtration and sample transfer devices made with the Pall-Gelman Metrigard filters (nominal 0.5 micron with acrylic binder) were only tested on a few of the more problematic samples, but gave results as good as, or better than, the GF/F filters.

After all microorganism specimens had completely dried, MALDI-TOF Mass Spectra were acquired for each over a mass/charge range of 2,000-34,000 on an Axima Assurance MALDI-TOF Mass Spectrometer (Shimadzu Biotech North America, Maryland).

After acquisition of each mass spectrum, a table of mass peaks was input into the "Saramis" microorganism identification software (bioMerieux Inc. USA) for analysis. This software is built upon a database of MALDI-TOF Mass Spectra collected of agar-grown microorganisms.

The Table 2 below shows the ID results using an integrated filtration and transfer device made with a Whatman GF/F filter or the Pall-Gelman Metrigard filters.

TABLE 2

Seeded cultures in SA bottles processed with depth filter type device

| Isolate | GF/F Device | Isolate | GF/F Device | Mertigard Device |
|---|---|---|---|---|
| E. coli, 104471 | 4 | S. epidermidis, D055 | 3 | ND |
| E. coli, 100257 | 4 | S. epidermidis, D069 | 3 | ND |
| E. coli, D104 | 4 | S. epidermidis, D082 | 4 | ND |
| E. coli, D168 | 4 | S. epidermidis, D092 | 4 | ND |
| P. aeruginosa, 105716 | 4 | E. faecalis, D149 | 4 | ND |
| P. aeruginosa, 107930 | 4 | E. faecalis, D135 | 4 | ND |
| E. aerogenes, 104098 | 4 | E. faecium, 13243 | 4 | ND |
| E. aerogenes, 107930 | 4 | E. faecium, 14334 | 4 | ND |
| K. pneumoniae, 108902 | 4 | E. faecium, D068 | 3 | ND |
| K. pneumoniae, 105245 | 4 | S. pneumoniae, 7265 | 3 | ND |
| S. aureus, 10754 | 3 | S. pneumoniae, 14226 | 3 | 3 |
| S. aureus, 8816 | 4 | S. pneumoniae, D013 | 3 | ND |
| S. aureus, 7537 | 3 | S. pneumoniae, D002 | 3 | ND |
| S. aureus, 7623 | 4 | S. pyogenes, 11629 | 2 | 3 |
| S. aureus, D164 | 4 | S. pyogenes, 11620 | 0 | 2 |
| S. aureus, D076 | 4 | S. pyogenes, 11631 | 3 | ND |
| S. aureus, D116 | 4 | S. pyogenes, 12897 | 3 | ND |
| S. aureus, D176 | 4 | C. albicans, 303070 | 4 | ND |
| S. epidermidis, 13298 | 3 | C. albicans, 18804 | 4 | ND |
| S. epidermidis, D011 | 4 | C. albicans, 302611 | 2 | 4 |
| S. epidermidis, D036 | 3 | C. albicans, 304765 | 4 | ND |
| S. epidermidis, D042 | 4 | C. albicans, 304771 | 3 | ND |
| | | C. albicans, 304776 | 4 | ND |

ID Confidence Ratings
4 = 99.9%
3 = 85-99.8%
2 = Species ID <85%, or Genus or Family ≥85%
0 = No ID
ND = Not Determined As shown in Table 2, the results of seeded cultures grown in SA bottles and processed with Filter Device made from depth filters rather than membranes. Overall, the results are very good, and similar to the best we have obtained by other processing methods. Device made with the Whatman GF/F filter (nominal 0.7 micron) gave confident IDs (≥85% confidence) to the species level (including typical low discrimination results with S. pneumoniae and C. albicans) with 43 of 46 isolates (93.5%), and ID to at least genus, or species at a lower confidence level, with 45 of 46 isolates (97.8%).

Accordingly, the use of depth filters showed an improvement over the previous experiments with membrane filters. It is likely that the higher cell numbers that can be trapped in a depth filter contributed to the improved results, but improved washing could also be a factor. Gram stains and/or cell counts of the captured organisms may help distinguish between the two possibilities.

Another difference from the previous tests is that the MALDI-TOF acquisition program was readjusted (as is required occasionally because of instrument/detector aging) in between the two experiments. The readjustment probably would have improved the membrane device results too, but would not solely account for the magnitude of the difference observed with the depth filters.

Example 4. Lysis-Filtration Mass Spectrometry Using an Integrated Filtration and Transfer Device Comprising Depth Filters with Resin Containing Media Bottles Fifty-one (51) microorganism isolates were grown, processed and analyzed by MALDI-TOF MS as described in Example 3, using an integrated filtration and sample transfer device employing Metrigard® depth filters except that a) seeded cultures were grown in bottles containing aerobic media with resins rather than BacT/ALERT® SA bottles, b) the Lysis Buffer had the following composition (0.6% w/v Brij-97+0.4M CAPS, pH 11.7), and c) the first wash solution had the following composition (20 mM sodium phosphate, 0.05% w/v Brij 97, 0.45% w/v NaCl, pH 7.2).

After all microorganism specimens had completely dried, MALDI-TOF Mass Spectra were acquired for each over a mass/charge range of 2,000-34,000 on an Axima Assurance MALDI-TOF Mass Spectrometer (Shimadzu Biotech North America, Maryland).

After acquisition of each mass spectrum, a table of mass peaks was input into the "Saramis" microorganism identification software (bioMerieux Inc. USA) for analysis. This software is built upon a database of MALDI-TOF Mass Spectra collected of agar-grown microorganisms.

The Table 3 below shows the ID results using an integrated filtration and transfer device made with Pall-Gelman Metrigard filters from cultures grown in aerobic resin-containing media.

TABLE 3

Seeded cultures in aerobic resin media bottles processed with depth filter type device

| Isolate | ID Conf. | Isolate | ID Conf. |
|---|---|---|---|
| E. coli, 104471 | 4 | S. epidermidis, 13298 | 4 |
| E. coli, 100257 | 4 | S. epidermidis, D011 | 4 |
| E. coli, D104 | 4 | S. epidermidis, D036 | 4 |
| E. coli, D168 | 4 | S. epidermidis, D055 | 4 |
| E. coli-101262 | 4 | S. epidermidis, D069 | 4 |
| E. aerogenes, 104098 | 4 | S. epidermidis, D082 | 4 |
| E. aerogenes, 107930 | 4 | S. epidermidis, D092 | 4 |
| K. pneumoniae, 108902 | 4 | E. faecalis, D149 | 4 |
| K. pneumoniae, 105245 | 4 | E. faecalis, D135 | 4 |
| K. pneumoniae-104143 | 3 | E. faecalis-15268 | 4 |
| K. pneumoniae-108904 | 3 | E. faecalis-15282 | 4 |
| P. aeruginosa, 105716 | 4 | E. faecium, 13243 | 4 |
| P. aeruginosa, 108042 | 4 | E. faecium, 14334 | 4 |
| P. aeruginosa-104104 | 4 | E. faecium, D050 | 4 |
| P. aeruginosa-108937 | 4 | E. faecium, D068 | 4 |
| S. aureus, 10754 | 4 | S. pneumoniae, 7265 | 3 |

TABLE 3-continued

Seeded cultures in aerobic resin media bottles processed with depth filter type device

| Isolate | ID Conf. | Isolate | ID Conf. |
|---|---|---|---|
| S. aureus, 8816 | 4 | S. pneumoniae, 14226 | 3 |
| S. aureus, 7537 | 4 | S. pneumoniae, D013 | 3 |
| S. aureus, 7623 | 4 | S. pneumoniae, D002 | 3 |
| S. aureus, D164 | 4 | S. pyogenes, 11629 | 3 |
| S. aureus, D076 | 4 | S. pyogenes, 11620 | 3 |
| S. aureus, D116 | 4 | S. pyogenes, 11631 | 3 |
| S. aureus, D176 | 4 | S. pyogenes, 12897 | 1 |
| C. albicans, 303070 | 4 | H. influenzae, 500891 | 3 |
| C. albicans, 304771 | 2 | H. influenzae, 500893 | 0 |
| C. albicans, 304776 | 0 | | |

ID Confidence Ratings
4 = 99.9%
3 = 85-99.8%
2 = Species ID <85%, or Genus or Family ≥85%
0 = No ID As shown in Table 3, the results of seeded cultures grown in resin-containing bottles and processed with Filter Device made from depth filters are very good. These processed cultures gave confident IDs (≥85% confidence) to the species level (including typical low discrimination results with S. pneumoniae and C. albicans) with 47 of 51 isolates (92.2%).

That which is claimed is:

1. An integrated filtration and sample transfer device comprising:
    a hollow elongated body having a first end that is capped with a filtration material, wherein said filtration material is a zeta charged membrane and is located adjacent to and extending from said first end in a convex shape, and a second end operable for providing fluid flow through the hollow elongated body; and
    a cotton adsorbent filling the hollow elongated body at the first end and supporting the filtration material.

2. The integrated filtration and sample transfer device of claim 1, wherein said second end is adapted for connection to a vacuum system, a syringe or a plunger to generate a vacuum.

3. The integrated filtration and sample transfer device of claim 1 or 2, wherein said hollow elongated body is made of a rigid or semi-rigid plastic material.

4. The integrated filtration and sample transfer device of claim 1, wherein said hollow elongated body comprises an elongated cylindrical body having a diameter of from about 0.5 mm to about 10 mm and a length of from about 2 cm to about 20 cm.

5. The integrated filtration and sample transfer device of claim 1, wherein the hollow elongated body has an internal volume of from about 0.5 cm$^3$ to about 10 cm$^3$.

6. The integrated filtration and sample transfer device of claim 1, wherein said adsorbent provides for passive filtration by providing a capillary action or wicking force for fluid flow.

7. The integrated filtration and sample transfer device of claim 1, wherein said filtration material has a pore size of from about 0.1 μm to about 10.0 μm.

8. A filtration and sample transfer assembly comprising: a plurality of the integrated filtration and sample transfer devices of claim 1 for the isolation and/or accumulation of a plurality of test samples and for the simultaneous transfer of the plurality of isolated and/or accumulated microorganisms to a container, slide or plate for analyzing said isolated or accumulated microorganisms.

9. The filtration and sample transfer assembly of claim 8, wherein said assembly further comprises:
    a base plate, a top plate and a pair of vertical support rods located between, and spacing said top plate from said base plate;
    a pair of base rails and corresponding pair of rack guide bars, which support a rack assembly having a plurality of wells for holding a plurality of individual tubes;
    a vertical axis bracket and a vertical stage, operable to allow said vertical axis bracket to be moved "up" and "down" along the vertical stage to raise and lower said top plate and said plurality of integrated filtration and sample transfer devices; and
    a vacuum assembly comprising a horizontally orientated alignment bar that contains a plurality of holes for holding a plurality of removable integrated filtration and sample transfer devices and a valve manifold comprising a plurality of valves and fittings each of which individually support and connect to said integrated filtration and sample transfer devices.

10. A kit for the isolation, accumulation and/or purification of microorganisms from a test sample comprising, in a packaged combination:
    (a) optionally a selective lysis buffer for the selective lysis of non-microorganism known to be present or that may be present in a test sample;
    (b) the integrated filtration and sample transfer device of claim 1 wherein said device is operable for the isolation, accumulation and/or purification of microorganisms from a test sample, and for the subsequent transfer of microorganisms to a container, slide or plate for analysis; and
    (c) at least one wash fluid or buffer for washing the isolated, accumulated and/or purified microorganism sample.

11. The kit of claim 10, wherein the kit comprises a selective lysis buffer and wherein said selective lysis buffer comprising one or more detergents.

12. The kit of claim 10, wherein said wash fluid or buffer comprises a pH buffer capable of maintaining a pH suitable for microorganisms.

13. The kit of claim 10, wherein said wash fluid or buffer is selected from the group consisting phosphate buffer, MOPS and TRIS buffer.

14. The kit of claim 10, wherein said kit further comprises one or more containers within which the lysis step can be carried out.

15. The kit of claim 10, wherein said kit further comprise one or more test slides or target plates for analysis by mass spectrometry.

16. The kit of claim 10, wherein said kit is configured for processing from about 1 to about 500 test samples.

17. A method of isolating and identifying a microorganism from a test sample, comprising:
    (a) obtaining a test sample known to contain or that may contain microorganisms;
    (b) optionally lysing non-microorganism cells and/or particulates in said test sample producing a lysed sample;
    (c) providing the integrated filtration and sample transfer device of claim 1;
    (d) isolating and accumulating said microorganisms from other components of said test sample or said lysed sample by filtration using the integrated filtration and sample transfer device of claim 1;

(e) transferring said isolated microorganism sample to a container or slide appropriate for analyzing and/or interrogating said isolated and accumulated microorganism sample;

(f) analyzing said isolated or accumulated sample of said microorganisms to acquire measurements for the characterization and/or identification of said microorganism; and (e) characterizing and/or identifying said microorganisms in said isolated and accumulated sample based on the acquired measurements.

18. The method of claim 17, wherein said analysis step (f) is selected from the group consisting of fluorescence spectroscopy, diffuse reflectance spectroscopy, absorption and transmission spectroscopy, infrared spectroscopy, terahertz spectroscopy, Raman spectroscopy, surface enhanced Raman spectroscopy, spatially offset Raman spectroscopy, resonance Raman spectroscopy, and any combination thereof.

19. The method of claim 17, wherein said analysis step (f) is by mass spectrometry and wherein said mass spectrometry is selected from the group consisting of MALDI-TOF mass spectrometry, desorption electrospray ionization (DESI) mass spectrometry, GC mass spectrometry, LC mass spectrometry, electrospray ionization (ESI) mass spectrometry and Selected Ion Flow Tube (SIFT) spectrometry.

20. The method of claim 17, wherein said sample is a clinical or non-clinical sample.

21. The method of claim 20, wherein said clinical sample is selected from the group consisting of blood, serum, plasma, blood fractions, joint fluid, urine, semen, saliva, feces, cerebrospinal fluid, gastric contents, vaginal secretions, tissue homogenates, bone marrow aspirates, bone homogenates, sputum, aspirates, swabs and swab rinsates and body fluids.

22. The method of claim 20, wherein said sample is a blood culture sample.

23. The method of claim 20, wherein said sample is a urine sample.

* * * * *